(12) United States Patent
Lee et al.

(10) Patent No.: US 10,404,772 B2
(45) Date of Patent: Sep. 3, 2019

(54) MULTIMEDIA DATA PROCESSING APPARATUS AND METHOD OF TERMINAL

(71) Applicant: Samsung Electronics Co. Ltd., Suwon-si, Gyeonggi-do (KR)

(72) Inventors: Heungki Lee, Suwon-si (KR); Seungseok Hong, Hwaseong-si (KR); Gilyoon Kim, Yongin-si (KR); Seunghwan Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 562 days.

(21) Appl. No.: 13/792,878

(22) Filed: Mar. 11, 2013

(65) Prior Publication Data

US 2013/0246582 A1 Sep. 19, 2013

(30) Foreign Application Priority Data

Mar. 13, 2012 (KR) .................. 10-2012-0025778

(51) Int. Cl.
| | |
|---|---|
| *G06F 15/16* | (2006.01) |
| *H04L 29/08* | (2006.01) |
| *H04N 21/442* | (2011.01) |
| *H04N 21/6373* | (2011.01) |
| *H04N 21/6375* | (2011.01) |

(Continued)

(52) U.S. Cl.
CPC ....... *H04L 67/02* (2013.01); *H04N 21/23439* (2013.01); *H04N 21/44209* (2013.01); *H04N 21/4621* (2013.01); *H04N 21/6373* (2013.01); *H04N 21/6375* (2013.01); *H04N 21/658* (2013.01); *H04N 21/6587* (2013.01)

(58) Field of Classification Search
CPC ... H04L 41/0893; H04L 47/824; H04L 67/04; H04L 41/0896; H04L 47/783; H04N 21/2402; H04N 21/44209; H04N 21/64738; H04N 21/2385; H04N 21/26258; H04N 21/6125; H04N 21/2662; H04N 21/4209; H04N 21/6478; H04N 1/2385; H04N 21/6258
USPC ...................................... 709/219
See application file for complete search history.

(56) References Cited

U.S. PATENT DOCUMENTS 5,898,833 A * 4/1999 Kidder ............... 709/234
6,672,775 B1 * 1/2004 Narayanaswami ........... 709/219
(Continued)

FOREIGN PATENT DOCUMENTS

| EP | 1 677 540 A1 | 7/2006 |
|---|---|---|
| EP | 2 129 126 A1 | 12/2009 |

(Continued)

*Primary Examiner* — Oleg Survillo
(74) *Attorney, Agent, or Firm* — Jefferson IP Law, LLP

(57) ABSTRACT

The data download method of a terminal device processing data downloaded in progressive download mode is provided. The method includes measuring bandwidth of the data downloaded, requesting, when the measured bandwidth is narrower than a reference bandwidth, for transmitting data with narrow bandwidth, registering a duration in which the data is downloaded with narrow bandwidth as a backup duration, requesting, when the measured bandwidth is equal to or greater than the reference bandwidth, for retransmission of backup data corresponding to the backup duration through a backup channel, and storing the data of the backup duration.

21 Claims, 21 Drawing Sheets

(51) Int. Cl.
*H04N 21/2343* (2011.01)
*H04N 21/462* (2011.01)
*H04N 21/658* (2011.01)
*H04N 21/6587* (2011.01)

(56) References Cited

U.S. PATENT DOCUMENTS

| | | | |
|---|---|---|---|
| 6,879,808 B1* | 4/2005 | Nations et al. | 455/12.1 |
| 7,949,775 B2* | 5/2011 | Virdi | H04N 21/2358 |
| | | | 709/231 |
| 9,002,259 B2* | 4/2015 | Morton | H04H 20/24 |
| | | | 455/3.01 |
| 9,112,942 B2* | 8/2015 | Ur | H04L 65/601 |
| 2004/0064573 A1 | 4/2004 | Leaning et al. | |
| 2006/0041674 A1* | 2/2006 | Reme | H04L 29/06027 |
| | | | 709/231 |
| 2009/0150715 A1 | 6/2009 | Pickens et al. | |
| 2009/0178091 A1 | 7/2009 | Miyamoto et al. | |
| 2010/0100635 A1 | 4/2010 | Takemura et al. | |
| 2010/0235537 A1 | 9/2010 | Kitazato | |
| 2010/0254684 A1* | 10/2010 | Saitoh et al. | 386/126 |
| 2011/0099594 A1 | 4/2011 | Chen et al. | |
| 2011/0264676 A1* | 10/2011 | Belan et al. | 707/756 |
| 2012/0110628 A1* | 5/2012 | Candelore | H04N 21/234327 |
| | | | 725/110 |
| 2013/0117415 A1* | 5/2013 | Gilson | H04N 21/23439 |
| | | | 709/219 |
| 2014/0304377 A1* | 10/2014 | Andersson | H04L 65/1083 |
| | | | 709/219 |

FOREIGN PATENT DOCUMENTS

| | | | |
|---|---|---|---|
| EP | 2 228 922 A2 | 9/2010 | |
| JP | 2009-188981 A | 8/2009 | |
| JP | 2010-154006 A | 7/2010 | |
| KR | 10-2011-0013823 A | 2/2011 | |
| WO | 2004/046847 A2 | 6/2004 | |
| WO | WO 2013083195 A1 * | 6/2013 | H04L 65/4084 |

* cited by examiner

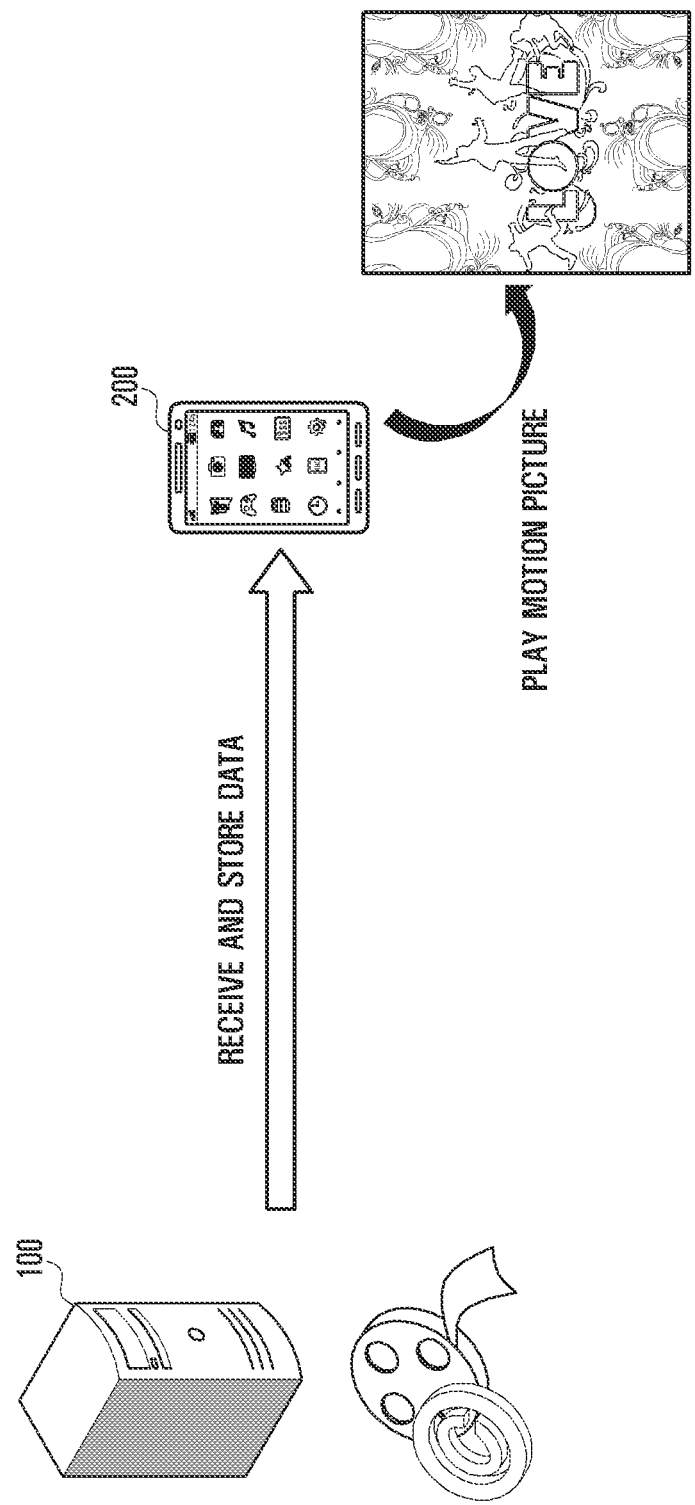

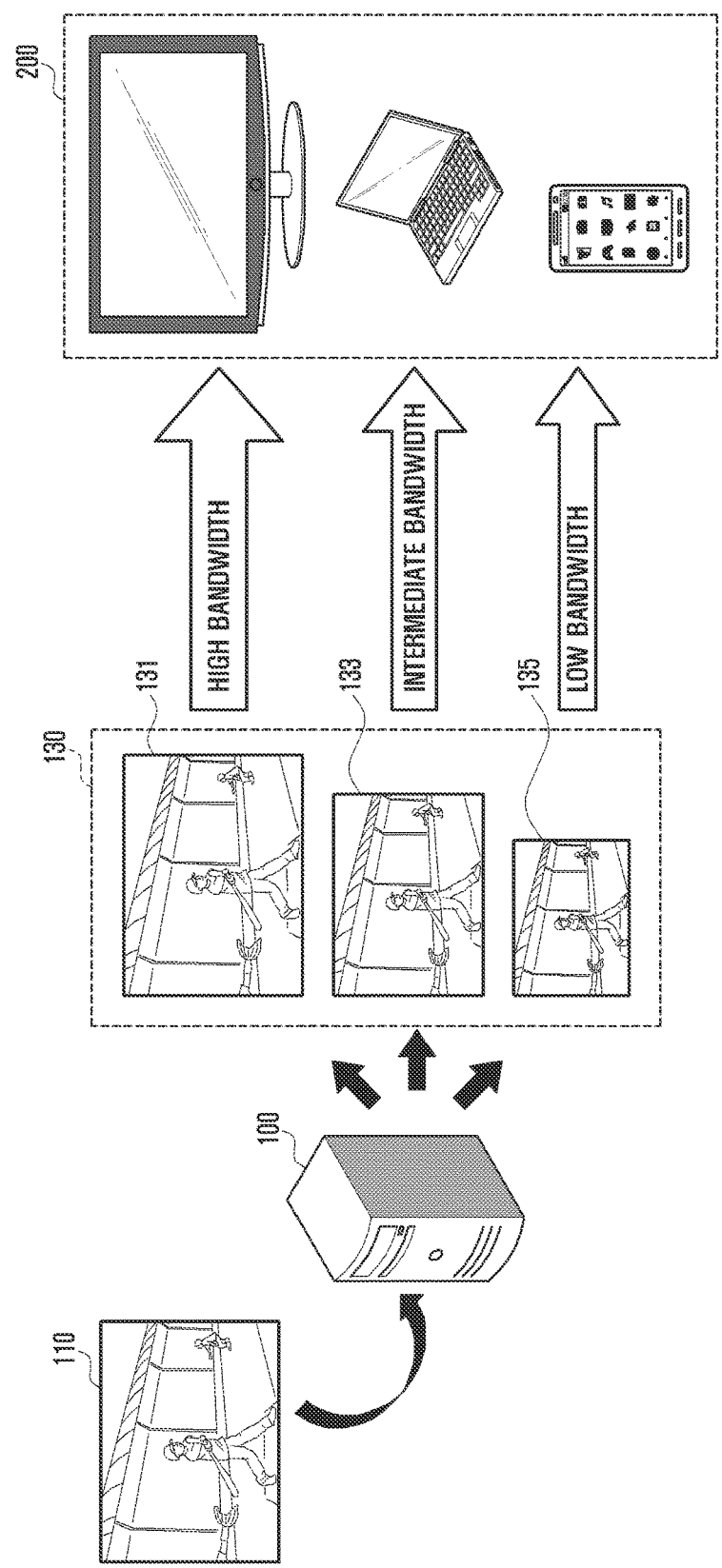

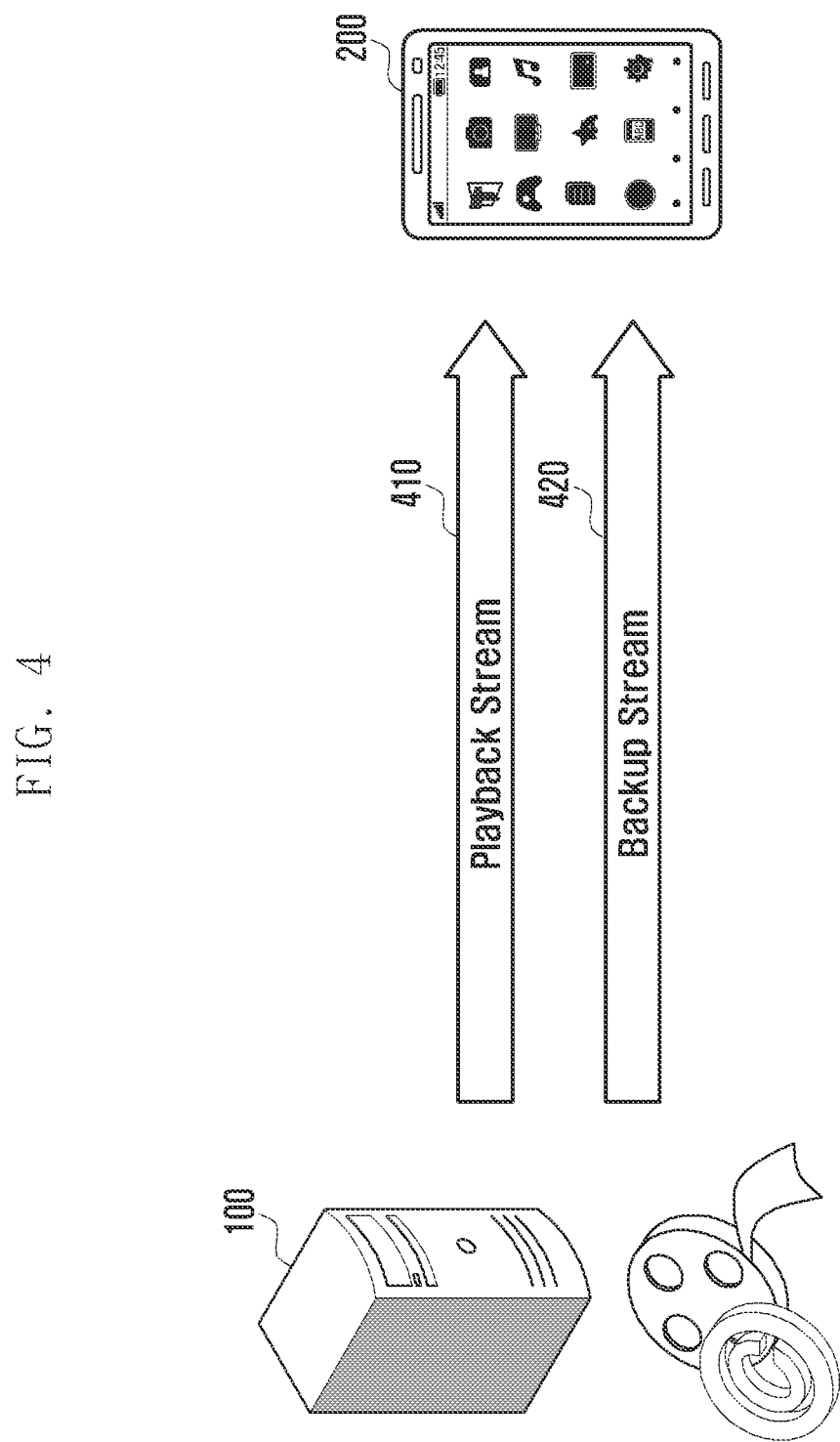

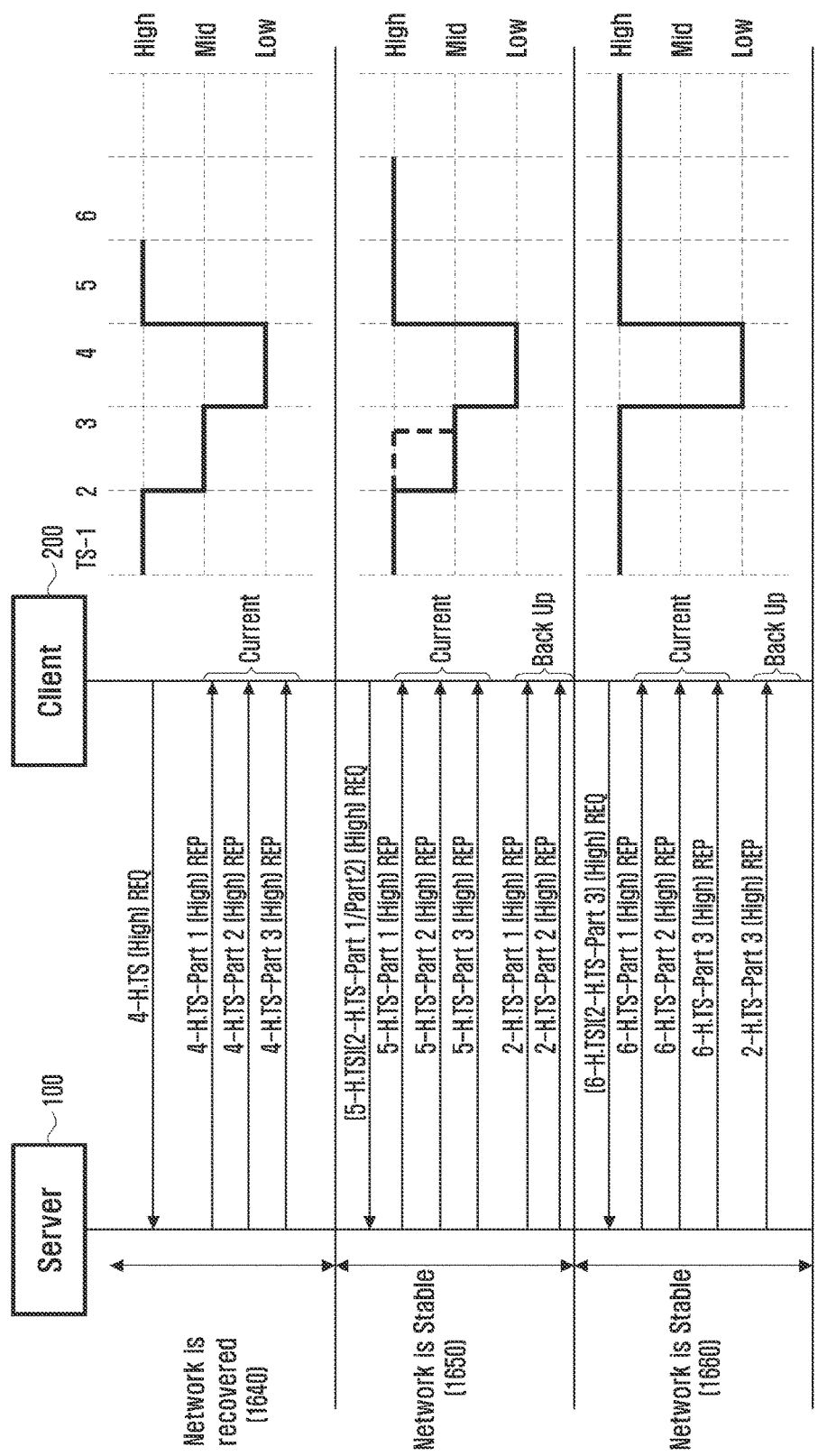

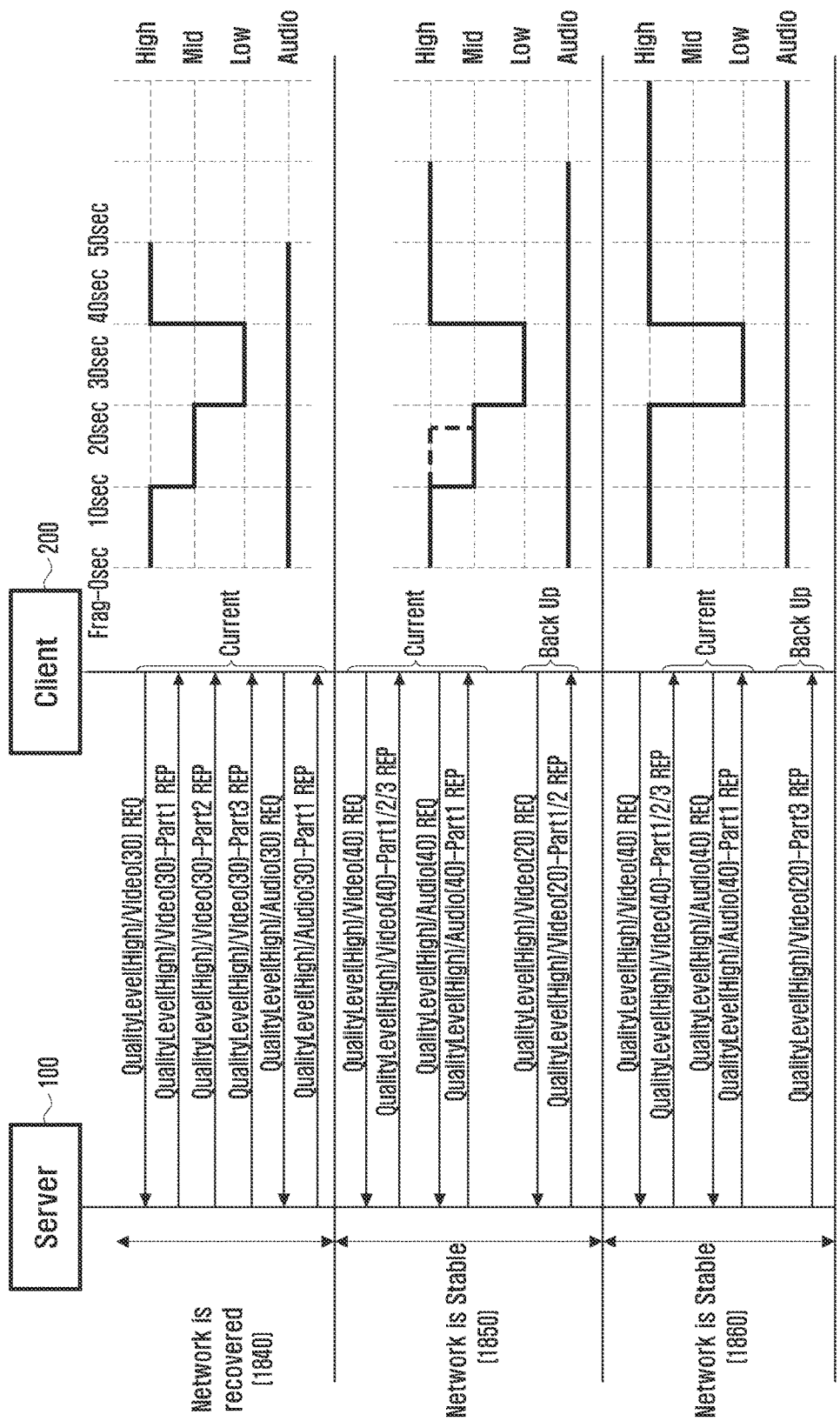

MULTIMEDIA DATA PROCESSING APPARATUS AND METHOD OF TERMINAL

PRIORITY

This application claims the benefit under 35 U.S.C. § 119(a) of a Korean patent application filed on Mar. 13, 2012 in the Korean Intellectual Property Office and assigned Serial No. 10-2012-0025778, the entire disclosure of which is hereby incorporated by reference.

BACKGROUND OF THE INVENTION

1. Field of the Invention

The present invention relates to a multimedia processing apparatus and method of a terminal. More particularly, the present invention relates to a multimedia data processing apparatus and method for performing progressive download of multimedia data.

2. Description of the Related Art

Recent portable terminals are capable of processing various multimedia data and accessing various types of multimedia services through a network. The network-based multimedia services include Video On Demand (VOD) and live streaming services. The VOD service enables the subscribers to select and watch video programs at any time by means of the portable terminal. The live streaming service enables the subscribers to download and play video or audio simultaneously in real time.

Such multimedia services are provided in various transfer modes. The multimedia transfer modes are categorized into three modes: download transfer mode of file sharing service using normal file transfer protocol such as File Transfer Protocol (FTP) and Hypertext Transfer Protocol (HTTP), streaming transfer mode for generating and transferring video and audio packets simultaneously in response to the subscriber request, and progressive download mode for allowing to play and store the video and audio bit streams simultaneously.

Typically, a multimedia service provider can select at least one of the three multimedia transfer modes to provide services. In the case of using the progressive download mode, the terminal device is capable of playing the multimedia data before the download is complete. That is, the terminal device accesses a server through a network (e.g., Internet Protocol (IP) communication network) and stores and plays the multimedia data downloaded from the server. At this time, if the communication quality of the network degrades (i.e., traffic load increases), the multimedia data download is delayed, resulting in choppy playback or playback failure in the worst case.

Therefore, a need exists for a system and method for an apparatus and a method of playing multimedia data being downloaded in the progressive download mode at a data rate varying according to the network condition and requesting the multimedia data played for a playback duration at a data rate lower than a predetermined data rate.

The above information is presented as background information only to assist with an understanding of the present disclosure. No determination has been made, and no assertion is made, as to whether any of the above might be applicable as prior art with regard to the present invention.

SUMMARY OF INVENTION

Aspects of the present invention are to address at least the above-mentioned problems and/or disadvantages and to provide at least the advantages and to provide at least the advantages described below. Accordingly, an aspect of the present invention is to provide an apparatus and a method of playing multimedia data being downloaded in a progressive download mode at a data rate that varies according to the network condition and requesting the multimedia data played for a playback duration at a data rate lower than a predetermined data rate.

In exemplary embodiments of the present invention, the terminal device analyzes the network state, i.e., communication environment, when the progressive download playback is initiated, stores and plays the downloaded multimedia data in a normal communication environment, registers the downloaded data as backup data while playing the downloaded data in an abnormal communication environment, and requests for the registered backup data when the communication environment is recovered to the normal condition to store corresponding data.

At this time, the backup data can be requested in such a way that, when the communication environment is recovered to receive the multimedia data at a data rate higher than a predetermined bandwidth in the middle of the progressive download, the terminal device requests for the backup data transmission while playing and storing the downloaded multimedia data. In the communication environment where the multimedia data is downloaded at a data rate lower than a predetermined reference data rate, the terminal device plays the data downloaded for the corresponding duration and stores the data downloaded at the low data rate or not.

In accordance with an aspect of the present invention, a data download method of a terminal device processing data downloaded in progressive download mode is provided. The method includes measuring bandwidth of data downloaded, requesting, when the measured bandwidth is narrower than a reference bandwidth, for transmitting data with narrow bandwidth, registering a duration in which the data is downloaded with narrow bandwidth as a backup duration, requesting, when the measured bandwidth is equal to or greater than the reference bandwidth, for retransmission of backup data corresponding to the backup duration through a backup channel, and storing the data of the backup duration.

In accordance with an aspect of the present invention, a multimedia data playback method of a terminal device is provided. The method includes configuring a reference bandwidth of progressive download playback, measuring bandwidth of the multimedia data downloaded, requesting, when the measured bandwidth is narrower than the reference bandwidth, for transmitting the multimedia data with the measured bandwidth, registering a duration corresponding to the bandwidth narrower than the reference bandwidth as a backup duration, re-requesting, when the bandwidth of the multimedia data is wider than the reference bandwidth, for multimedia data of the backup duration, storing the downloaded multimedia data and the backup data, storing, when the bandwidth of the multimedia data matches the reference bandwidth, the downloaded data, and requesting data transmission with the reference bandwidth.

In accordance with another aspect of the present invention, a progressive download playback apparatus of a terminal is provided. The apparatus includes a communication unit for requesting a server for transmitting data and downloads the data through a playback channel and backup data through a backup channel, a storage unit including a download table and a content storage, a control unit for measuring bandwidth of the data downloaded, for requesting, when the measured bandwidth is narrower than a reference bandwidth, for transmitting data with narrow bandwidth, for registering a duration in which the data is downloaded with narrow bandwidth as a backup duration with the download table, for requesting, when the measured bandwidth is equal to or greater than the reference bandwidth, for retransmission of backup data corresponding to the backup duration, and for storing the downloaded data in the content storage, and a display unit for displaying the downloaded data under control of the control unit.

In accordance with still another aspect of the present invention, a multimedia data processing method of a terminal device is provided. The method includes measuring bandwidth of multimedia data which is being downloaded and played, registering, when the measured bandwidth is narrower than a reference bandwidth, a duration during which the multimedia data with low bandwidth as a backup duration, the multimedia data being stored simultaneously, storing, when the measured bandwidth matches the reference bandwidth, the received multimedia data, requesting, when the measured bandwidth is equal to or greater than the reference bandwidth, for retransmission of backup data, storing the downloaded multimedia data, and storing the multimedia data received through a backup channel as corresponding backup duration data.

The terminal device according to an exemplary embodiment of the present invention registers, when the multimedia data is received at a data rate lower than a predetermined reference data rate in progressive download playback, the duration for which the data has been downloaded at a low data rate as backup duration and requests, when it becomes possible to receive the backup data, retransmission of the multimedia data registered as the backup data to store the received data at the reference data rate. Accordingly, the terminal device downloads and plays the multimedia data in the progressive download mode at a data rate adaptive to the communication environment and re-downloads the multimedia received at a data rate lower than the reference data rate through a backup channel when the communication is recovered to the normal state. As a consequence, the terminal device is capable of playing the multimedia data seamlessly regardless of the communication environment in the progressive download playback and storing the multimedia data downloaded at a data rate lower than the reference data rate at the reference data rate.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

FIG. 1 is a diagram illustrating progressive download playback for downloading and playing multimedia data simultaneously according to an exemplary embodiment of the present invention.

FIG. 2 is a diagram illustrating a method for stream transfer from a server to a terminal device adaptive to a network environment according to an exemplary embodiment of the present invention.

FIG. 4 is a diagram illustrating an operating principle of multimedia data download method in a progressive download playback mode according to an exemplary embodiment of the present invention.

FIGS. 16A and 16B are diagrams illustrating an operation mechanism of progressive download playback in an HTTP live stream using an index file structure according to an exemplary embodiment of the present invention.

FIGS. 18A and 18B are diagrams illustrating an operation mechanism of a progressive download playback in a smooth stream using a index file structure according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 3A:
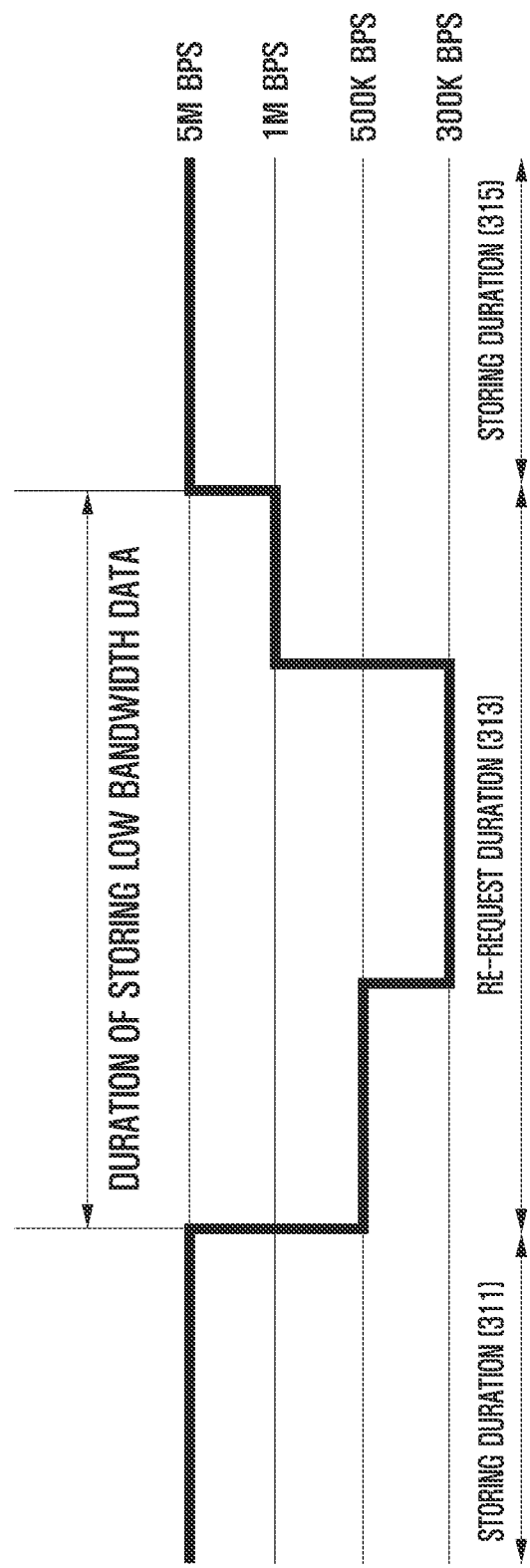
FIGS. 3A and 3B are diagrams illustrating a procedure for re-requesting multimedia data for a duration in which the multimedia data has been received in a bandwidth that is narrower than a predetermined threshold bandwidth in progressive download playback of a terminal device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although certain features such as a multimedia data index file, a playback time, a data rate, a bandwidth, and a display screen size are presented in the following description, it is obvious to those skilled in the art that these are given as examples only to help understand the invention but not restrict the present invention.

According to an exemplary embodiment of the present invention, the terminal device receives and plays multimedia data, which is downloaded in the progressive download mode, at a data rate adaptive to the communication environment and requests for retransmission of the data received at a data rate lower than a predetermined reference data rate when the communication environment is recovered. That is, the terminal device according to an exemplary embodiment of the present invention operates in an Adaptive Progressive Download Playback mode so as to, if the communication environment fulfills a predetermined reference data rate for receiving data, store and play the data received in Playback Stream and, otherwise, request the server for the data transfer at a low data rate and thus play the download data while registering the corresponding duration. Afterward, if the communication environment is recovered to a normal state, the terminal device plays and stores the data being received on the playback channel and requests for retransmission of the data corresponding to the registered backup duration on a backup channel simultaneously.

In the following description, the terms "network speed", "communication speed", "data rate", and "data reception rate" are interchangeably used in the meaning of the data rate of the multimedia data from a server to a terminal device which influence the bandwidth for multimedia data transmission. The term "reference bandwidth" means the data size (or data rate) for storing the multimedia data downloaded while being played by the user in progressive download playback mode. The term "unit data" means the data unit for download from the server in the progressive download playback, e.g., Transport Stream (TS) in Hypertext Transfer Protocol (HTTP) live streaming service and fragment in Smooth Streaming service.

FIG. 1 is a diagram illustrating progressive download playback for downloading and playing multimedia data simultaneously according to an exemplary embodiment of the present invention.

Referring to FIG. 1, the progressive download playback is a method for a terminal device 200 as a client stores and plays the multimedia data simultaneously while the multimedia data are transferred from a server 100 to the terminal device 200. The progressive download playback is advantageous in that it is possible to start playback before the download of a multimedia file is complete such that the user is capable of checking the reaction of the server 100 immediately. At this time, if the terminal device 200 continues playback of the multimedia data in the progressive download mode, the data transfer rate from the server 100 to the terminal device 200 (i.e., the data reception rate of the terminal device 200) has to be higher than the playback data rate of multimedia data (data rate capable of securing playback time of the multimedia data, bit rate). For example, if the multimedia data is a motion picture and if the playback data rate of the motion picture is 1 Mbps, the network environment (i.e., the data transfer rate from the server 100 to the terminal device 200) has to fulfill the data rate greater than 1 Mbps in order for the terminal device 200 to receive the motion picture seamlessly. Assuming that the motion picture of 1 Mbps is played in the progressive download playback with the network speed of 2 Mbps, the motion picture having the size of 100 MB is downloaded in 50 seconds so as to start playing immediately.

However, if the communication environment worsens and thus the data transfer rate from the server 100 to the terminal device 200 (i.e., network speed) falls below the playback data rate of the multimedia data, i.e., if the network speed becomes lower than the bandwidth of the multimedia data, the terminal device 200 cannot play the multimedia data normally. That is, the multimedia playback speed is faster than the multimedia data reception speed. Here, the bandwidth means the peak bit rate of the multimedia data or the transfer bandwidth, i.e., bit rate, necessary for transferring the data normally.

In order to accomplish this, the terminal device 200 according to an exemplary embodiment of the present invention downloads and plays the multimedia data at a variable bit rate adaptive to the communication environment with the server 100 in the progressive download playback mode. For this purpose, the server 100 stores the multimedia data with multiple bandwidths per content.

FIG. 2 is a diagram illustrating a method for stream transfer from a server to a terminal device adaptive to the network environment according to an exemplary embodiment of the present invention.

Referring to FIG. 2, when it acquires multimedia data 110, the server 100 creates and stores copies of the multimedia data in different bandwidths. If the multimedia data is a motion picture, the server 100 acquires the motion picture 110 and registers the copies of the motion pictures as denoted by reference numbers 131, 133, and 135 that are created and stored in different bandwidths with an internal database. That is, the motion picture copy 131 has a bandwidth wider than those of the motion picture copies 133 and 135, and the motion picture copy 133 has a bandwidth narrower than that of the motion picture copy 131 and wider than that of the motion picture copy 135. Here, although the playback times of the motion pictures 131 to 135 are identical to each other, the motion picture copy 131 is greatest in data amount among them. Accordingly, the terminal device 200 requests the server 100 for the motion picture copy 131 in a good communication environment and the motion picture copy 133 or 135 in a worse communication environment. This means that the terminal device 200 requests the server 100 for the multimedia data having different bandwidth in an adaptive stream download manner.

Regarding the multimedia data copy having a bandwidth lower than that of the multimedia copy requested by the user in the progressive download playback, the terminal device 200 re-requests for the multimedia data for the corresponding duration to be stored.

Figure 3B:
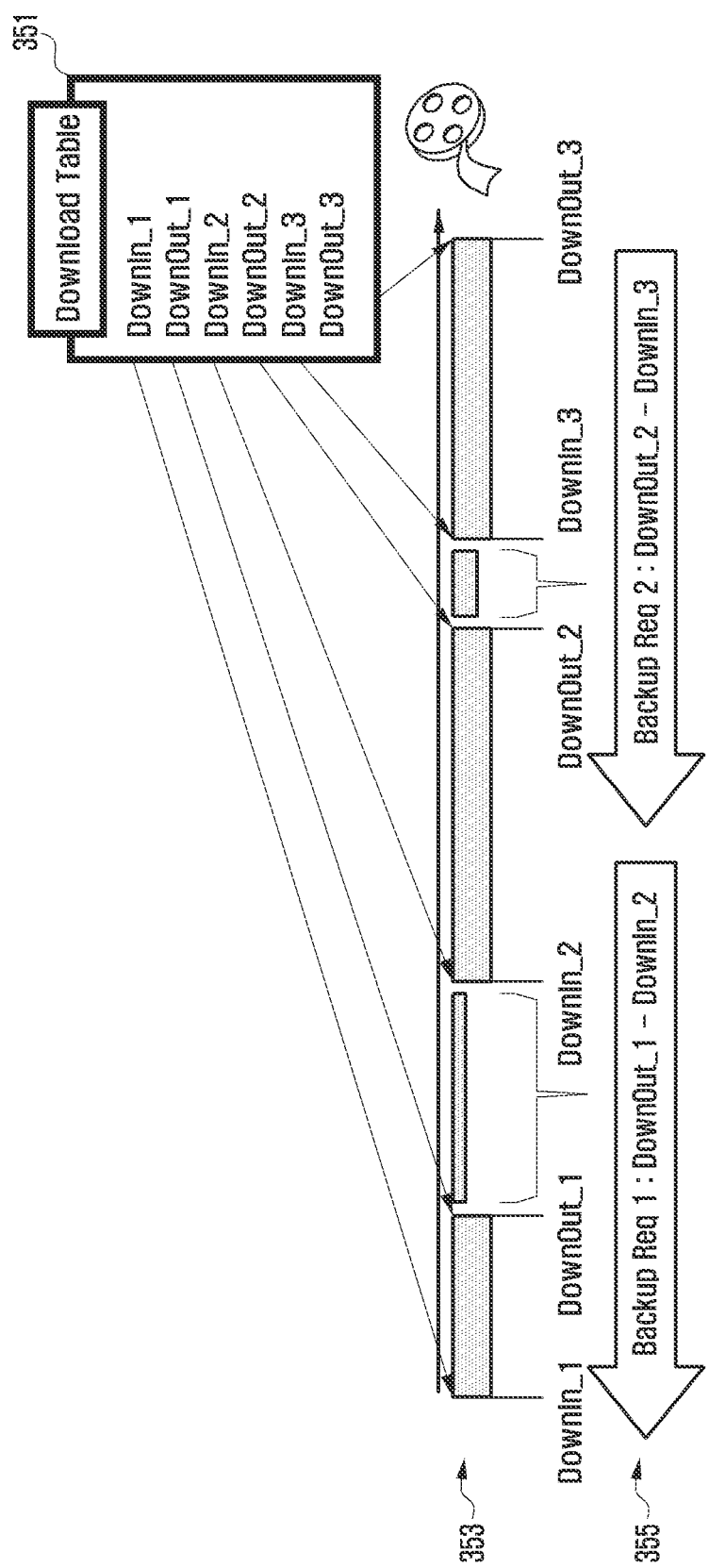

FIGS. 3A and 3B are diagrams illustrating a procedure for re-requesting multimedia data for a duration in which the multimedia data has been received in a bandwidth that is narrower than a predetermined threshold bandwidth in progressive download playback of the terminal device according to an exemplary embodiment of the present invention.

Referring to FIGS. 3A and 3B, the terminal device 200 downloads and plays multimedia data at a data reception rate adaptive to the communication environment in the Adaptive and Progressive Download Playback mode according to an exemplary embodiment of the present invention. In the case that the multimedia data is received in the user-requested bandwidth, the terminal device 200 stores and plays the multimedia data copy simultaneously for the durations 311, 313, and 315. However, if the multimedia data is received in a bandwidth narrower than the bandwidth requested by the user as denoted by reference number 313 of FIG. 3A, the terminal device 200 registers the corresponding duration as a re-request duration. Although the user has configured the multimedia device to store the multimedia data with high video quality in adaptive progressive download playback, the bandwidth of the multimedia data may become narrow according to the communication environment. In this case, the terminal device 200 re-requests for the multimedia data for the corresponding duration when the communication environment is recovered.

In order to accomplish this, the terminal device 200 is provided with a download table 351 as shown in FIG. 3B for registering the multimedia data downloaded normally. That is, in the case of downloading the multimedia data as denoted by reference number 353, the multimedia data is downloaded in the user-requested bandwidth during downin 1-downout 1, downin 2-downout 2, downin 3-downout 3 periods and in a bandwidth narrower than the user-requested bandwidth during the downout 1-downin 2 and downout 2-downin 3 periods. In this case, the multimedia data received in the user-requested bandwidth during the downin 1-downout 1, downin 2-downout 2, and downin 3-downout 3 periods are registered with the download table 351. If the communication environment is recovered, the terminal device 200 requests for retransmission of the multimedia data which have been received in the narrow bandwidth during the downout 1-downin 2 and downout 2-downin 3 periods as denoted by reference number 355 and stores the re-downloaded multimedia data. If the download of the retransmitted multimedia data completes successfully (i.e., the multimedia data of the user-requested bandwidth is re-downloaded), the terminal device 200 updates the download table 351 with the information on the re-downloaded multimedia data.

In the case of downloading the multimedia data as denoted by reference number 353, the terminal device 200 plays the multimedia data in the sequence downloaded. In this case, the multimedia data is downloaded in different bandwidths such that the quality of the multimedia data playback (e.g., video quality of motion picture) varies depending on the bandwidth.

FIG. 3B is directed to the case where the download table 351 presents the information on the periods during which the multimedia data is received in the user-requested bandwidth. However, the download table 351 can be configured such that the information on the periods during which the multimedia data is received in the bandwidth narrower than the user-requested bandwidth is registered therewith. In this case, the multimedia data is received as denoted by reference number 353 includes the information on the downout 1-downin 2 and downout 2-downin 3 periods. If the multimedia data is re-downloaded in the intended bandwidth successfully, the terminal device 200 is capable of updating the download table 351 by deleting the information on the corresponding periods.

Figure 5:
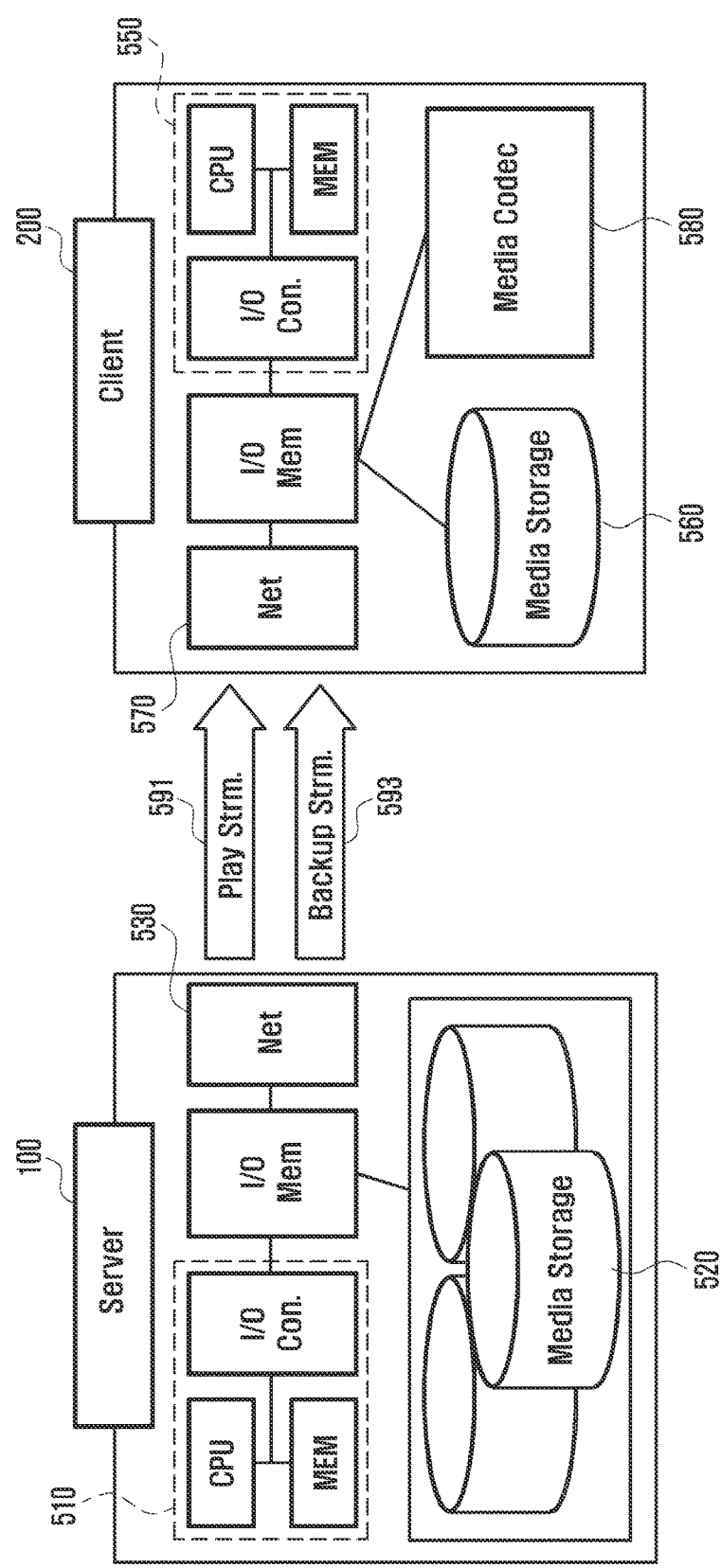
FIG. 5 is a diagram illustrating configurations of a server and a terminal device for downloading multimedia data according to an exemplary embodiment of the present invention.

FIG. 4 is a diagram illustrating an operating principle of multimedia data download method in a progressive download playback mode according to an exemplary embodiment of the present invention. FIG. 5 is a diagram illustrating configurations of a server and a terminal device for downloading multimedia data according to an exemplary embodiment of the present invention.

Referring to FIGS. 4 and 5, the terminal device 200 downloads the multimedia data through two channels, i.e., playback channel 410 and backup channel 420, in progressive download playback. Here, the playback channel 410 is the channel receiving the multimedia data which is being played currently, and the backup channel 420 is the channel downloading the multimedia data re-requested. In FIG. 5, the terminal device 200 operates as a client of the server 100. As aforementioned, the server 100 has different bandwidth copies of the multimedia data stored in a storage unit 520, and a control unit 510 controls to retrieve the multimedia data corresponding to the bandwidth requested by the terminal device 200 and transmit the multimedia data by means of a communication unit 530. The terminal device 200 receives the multimedia data by means of a communication unit 570, and a control unit 550 plays the downloaded multimedia data on a display unit (not shown) using a media codec 580 and stores, if the bandwidth of the multimedia data matches the intended bandwidth, the multimedia data in a storage unit 560. Here, the communication units 530 and 570 may be wireless communication modules or wired communication modules. If the terminal device 200 is a wireless terminal device, the communication units 530 and 570 may be wireless communication modules using standards such as Long Term Evolution (LTE), Wideband Code Division Multiple Access (WCDMA), Global System for Mobile Communications (GSM), and CDMA communication modules for connecting to cellular networks via a base station or Wi-Fi, Worldwide interoperability for Microwave Access (WiMAX), and Wireless broadband (Wibro) communication modules for connecting to Internet Protocol (IP) networks. If the terminal device 200 is a wired terminal device such as IP TV, the terminal device 200 can be provided with a set-top box which connects to the server 100 through a cable.

The control unit 550 of the above-structured terminal device 200 analyzes the multimedia data stream downloaded through a playback channel 591 and stores, if the multimedia data has the user intended bandwidth, the multimedia data in the storage unit 560 and plays the multimedia data on the display unit (not shown). At this time, if the bandwidth of the multimedia data downloaded through the playback channel 591 is narrower than the user-intended bandwidth, the control unit 550 plays the multimedia data on the display unit and registers the corresponding period during which the multimedia data has downloaded in the low bandwidth as backup period with the storage unit 560. Here, the storage unit 560 is provided with the download table for registering the backup period information and contents storage for storing the downloaded multimedia data.

In the case of receiving the multimedia data stream through the playback channel 591 as denoted by reference number 353 of FIG. 3B, the control unit 550 is capable of playing the multimedia data downloaded in the user-intended bandwidth during the downin 1-downout 1, downin 2-downout 2, and downin 3-downout 3 periods on the display unit while storing the downloaded multimedia data. However, the control unit 550 registers the downout 1-downin 2 and downout 2-downin 3 periods as backup duration while playing the multimedia data received in a bandwidth narrower than the user-intended bandwidth during the downout 1-downin 2 and downout 2-downin 3 periods. At this time, the backup duration information can be stored in an internal memory or the storage unit 560.

If the network environment is recovered in a state where the progressive download playback is progressing or ended, the terminal device 200 requests the server 100 for retransmission of the multimedia data received in the narrow bandwidth during the downout 1-downin 2 and downout 2-downin 3 periods, and the control unit 510 of the server 100 accesses the multimedia data requested for retransmission (data corresponding to the downout 1-downin 2 and downout 2-downin 3 periods) and retransmits the multimedia data through a backup channel 593. At this time, the multimedia data downloaded through the backup channel 593 is the multimedia data of the user-intended bandwidth, and the terminal device 200 stores the downloaded multimedia data.

As described above, the terminal device 200 according to an exemplary embodiment of the present invention plays and stores the multimedia data downloaded in progressive download playback. In this state, if the network environment becomes so bad as to prevent receipt of the multimedia data in a reference bandwidth, the terminal device 200 requests the server 100 to transmit the multimedia data in the bandwidth narrower than the reference bandwidth and stores the downloaded data with playback. At this time, the information on the corresponding duration is registered with the download table. Afterward, the terminal device 200 requests the server 100 for retransmission of the multimedia data corresponding to the download duration of low bandwidth during which the multimedia data has not stored and receives stores the corresponding multimedia data with high quality.

Figure 6:
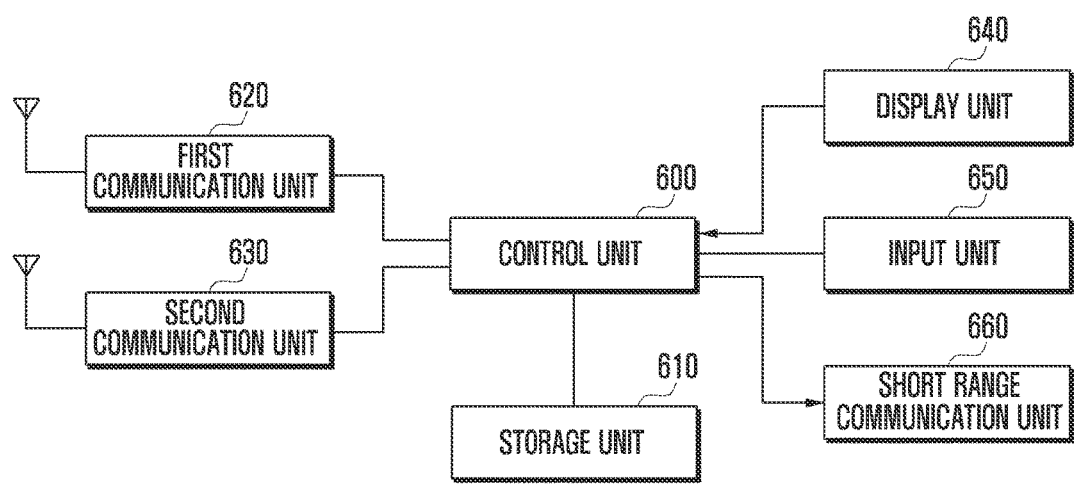
FIG. 6 is a block diagram illustrating a configuration of a terminal device for performing progressive download playback according to an exemplary embodiment of the present invention.
Figure 7:
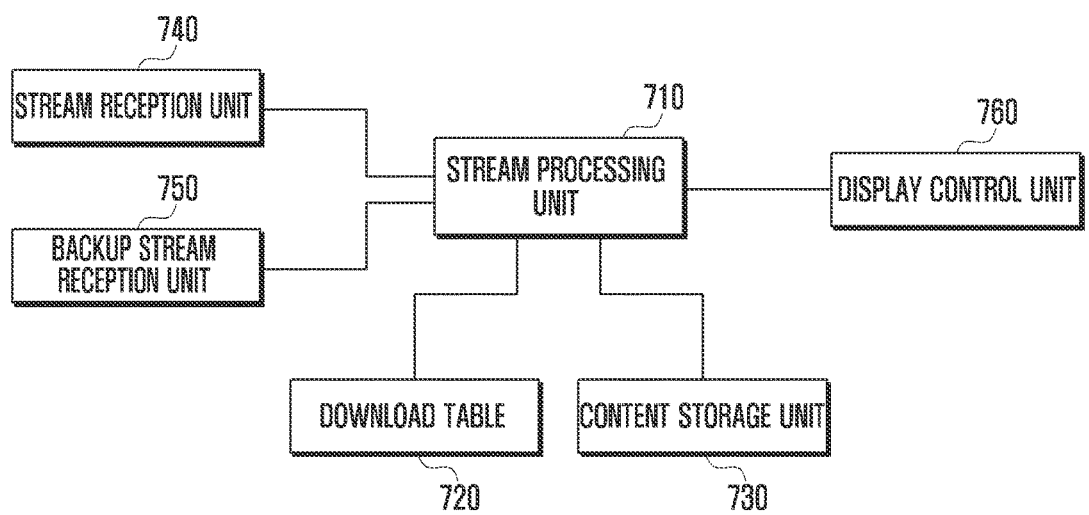
FIG. 7 is a block diagram illustrating a configuration of a control unit 600 according to an exemplary embodiment of the present invention.

FIG. 6 is a block diagram illustrating a configuration of a terminal device for performing progressive download playback according to an exemplary embodiment of the present invention. Here, the description is made under the assumption that the terminal device 200 is a wireless terminal device. FIG. 7 is a block diagram illustrating a configuration of a control unit according to an exemplary embodiment of the present invention.

Referring to FIG. 6, each of first and second communication units 620 and 630 is responsible for the function of establishing a connection to a communication network. Each of the communication units 620 and 630 may include a transmitter having a frequency-up converter for up-converting a base-band signal to a Radio Frequency (RF) signal and a power amplifier for amplifying an RF signal and a receiver having an amplifier for low noise amplifying a received RF signal and a frequency down converter for down-converting an RF signal to a base-band signal. Each of the communication units 620 and 630 may include a modulator for modulating the transmission signal and deliver the modulated signal to the transmitter and a demodulator for demodulating the signal output by the receiver. Here, the modulator/demodulator can one of a WCDMA or CDMA based $3^{Rd}$ Generation (3G) and GSM, LTE (i.e., $4^{th}$ Generation (4G)), WiFi, Wibro, and Wimax modulators/demodulators.

A control unit 600 controls overall operations of the terminal device 200. Here, the control unit 600 may include a communication controller (mobile processor, MP) and an application controller (processor, AP). The overall operations can be performed by the application controller. In this case, the application controller controls download and playback of the multimedia data received from the server 100 through the first and second communication units 620 and 630 in the progressive download playback according to an exemplary embodiment of the present invention.

A storage unit 610 may include a program memory for storing programs and a data memory for storing install data and data generated during operation of the programs according to an exemplary embodiment of the present invention. According to an exemplary embodiment of the present invention, the storage unit 610 stores the downloaded multimedia data and the information on the backup duration during which the multimedia data has been received in a bandwidth narrower than a predetermined reference bandwidth.

A display unit 640 displays the multimedia data downloaded under the control of the control unit 600. An input unit 650 receives input of the command for controlling the operation of the terminal device 200 and data. The input unit 650 and the display unit 640 can be integrated into a touchscreen panel. A short range communication unit 660 is responsible for a data communication function of the terminal device 200 with an external display device. Here, the display device can be a television reception device, and the short range communication unit 550 can be implemented with a wireless communication module (e.g., Bluetooth) or a wired (Universal Serial Bus (USB)) module.

Each of the first communication unit 620 and/or the second communication unit 630 is capable of being connected to a base station for voice and data communication and an IP network for data communication. At this time, the communication unit connected to the base station is provided with a 3G or 4G modulator/demodulator for voice and data communication service, and the communication unit is connected to the IP network 110 for receiving a data communication service. In the following description, the first communication unit 620 may be provided with a modem supporting at least one of Wi-Fi, Wibro, and Wimax for connection with the IP network 110. The second communication unit 630 may be provided with a modem supporting at least one of GSM, CDMA, WCDMA, and LTE for voice and data communication in connection with the base station. Here, the second communication unit 630 is also capable of connecting to the IP network 110 via a base station. Although FIG. 6 is directed to the case of the terminal device 200 having two communication units, the terminal device 200 is capable of including any number of communication units for establishing radio connections with plural base stations (e.g., base stations operating in GSM, WCDMA, and LTE communication modes). That is, although the description is directed to the communication unit having the first and second communication modules, the communication unit can be configured with three or more communication modules.

The above-structured terminal device 200 is capable of operating as a client of the server 100.

Referring to FIG. 7, a stream reception unit 740 receives the multimedia data downloaded through the playback channel in the progressive download playback. A backup stream reception unit 750 receives the backup multimedia data received through the back channel. A stream processing unit 710 analyzes the multimedia data (playback stream)

received by the stream reception unit 740 to store the multimedia data having the predetermined reference bandwidth in a content storage unit 730 and registers the duration during which the multimedia data having the bandwidth lower than the reference bandwidth is received with a download table 720 without playback of the multimedia data. The stream processing unit 710 also analyzes the playback stream to request the server 100 for transmission of the multimedia data having the bandwidth narrower than the reference bandwidth according to the analyzed multimedia data bandwidth and, when the network environment is recovered to support the bandwidth wider than the reference bandwidth, requests the server 100 for retransmission of the multimedia data corresponding to the backup duration registered with the download table 720. A display control unit 760 controls the display unit 640 to display the multimedia data processed by the stream processing unit 710.

In FIG. 7, the multimedia data transmission request channel (channel for transmission from the terminal device 200 to the server 100, or uplink channel) is not depicted. The uplink channel is the channel for the terminal device 200 to request the server 100 for transmission of the multimedia data of the bandwidth determined by the stream processing unit 710 according to the communication environment such that the transmission request for the multimedia data of the reference bandwidth set by the user according to the received playback stream analysis, multimedia data of the narrow bandwidth available in the current communication environment, multimedia data of the reference bandwidth set by the user, or backup-registered multimedia data can be transmitted to the server 100 through the uplink channel. At this time, if the first communication unit 620 is in charge of the multimedia data communication channel in WiFi mode, it is possible to configure the playback channel and backup channel with the one IP address and different sockets or different IP addresses. If the second communication unit 630 is in charge of the communication channel, the terminal device 200 is capable of being allocated different channels for receiving the informations on the playback channel and the backup channel.

Figure 8:
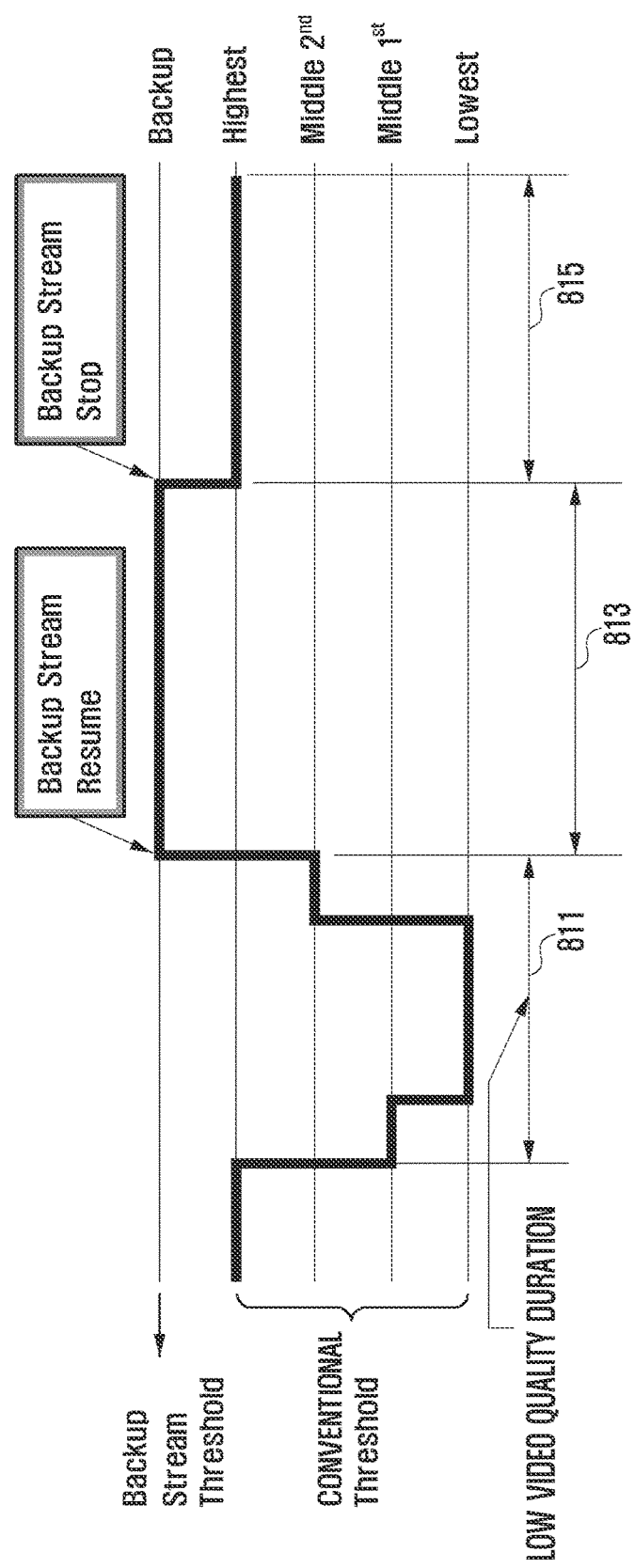
FIG. 8 is a diagram illustrating an operation for a terminal device to download multimedia data in a variable bandwidth adaptive to a communication environment according to an exemplary embodiment of the present invention.

FIG. 8 is a diagram illustrating an operation for a terminal device to download multimedia data in a variable bandwidth adaptive to a communication environment according to an exemplary embodiment of the present invention.

Referring to FIG. 8, the control unit 600 requests the server 100 to transmit the multimedia data according to a data unit. Here, the data unit is determined depending on the streaming method. For example, the HTTP live streaming uses TS as the data unit, the smooth streaming/Dynamic Adaptive Streaming over HTTP (DASH) uses a fragment as the data unit. At this time, the control unit 600 requests for the size of the data unit in requesting for multimedia data transmission along with the transmission bandwidth information. The server 100 transmits data through the playback channel by data unit of the bandwidth requested by the control unit 600. The control unit 600 analyzes the reception rate of the data received through the playback channel to determine whether the reception rate fulfills the bandwidth of the multimedia data.

If the download data reception rate from the server 100 does not fulfill the threshold value of multimedia data bandwidth (i.e., if the data reception rate is less than the playback data rate of the multimedia data), the control unit 600 requests for the multimedia data having bandwidth narrower than the reference bandwidth set by the user in requesting for the unit data transmission. The server 100 transmits the multimedia data having the narrow bandwidth as requested by the terminal device 200 through the playback channel, and the terminal device 200 receives the multimedia data having narrow bandwidth as denoted by reference number 811 of FIG. 8. In this case, the control unit 600 displays the multimedia data downloaded during the period 811 on the display unit 640 and registers the period 811 as backup duration. That is, if the data reception rate becomes less than the playback data rate, the control unit 600 requests for unit data transmission of the multimedia data having bandwidth narrower than the preset reference bandwidth.

In the above state, if the data reception rate of the multimedia data (i.e., data transfer rate of the downloaded multimedia data) becomes greater than the preset reference bandwidth, the control unit 600 requests for the transmission of the multimedia having the preset reference bandwidth. In this state, if the data transfer rate of the multimedia data having the preset reference bandwidth is high enough to receive the multimedia data having the bandwidth wider than the preset reference bandwidth, i.e., if exceeding the backup stream threshold, the control unit 600 requests the server 100 for transmission of the multimedia data corresponding to the backup duration registered with the download table during the period 813. Assuming that E_B is Estimated Bandwidth, TS is the transferred data size, and TT is the transmission time, then EB=T_S/T_T. At this time, assuming that TP p is time of highest quality layer, ST_p is Download Size of highest quality layer, and ST_b is Download Size of backup stream, a threshold value for downloading Playback Stream and Backup Stream simultaneously (Threshold Value: Resume the backup stream) can be determined as EB>(S_Tp+S_T_b)/(P_Tp). Here, the server 100 transfers the unit data of the requested multimedia data through the playback channel and the requested backup data through the backup channel. At this time, the playback stream and backup stream can be the multimedia data having the reference bandwidth set by the user, and the control unit 600 stores the playback stream in the storage unit 610 and displays the playback stream on the display unit 640 simultaneously while storing the backup stream in the corresponding unit data duration of the storage unit 610. The control unit 600 also deletes the duration of the multimedia data stored as backup data from the download table of the storage unit 610.

In the state of repeating the above operations, if the data reception rate changes to the level available for receiving multimedia data having the preset reference bandwidth, the control unit 600 stops requesting for backup data transmission and requests for the multimedia data transmission in the corresponding duration. In reply, the server 100 transmits the unit data of the requested duration through the playback channel, and the control unit 600 displays and stores the multimedia data downloaded through the playback channel during the period 815 of FIG. 8.

The terminal device 200 determines the reception rate of the data downloaded from the server 100 while operating in the progressive download playback mode and repeats the operations as described with reference to FIG. 8 according to the reception rate.

Figure 9:
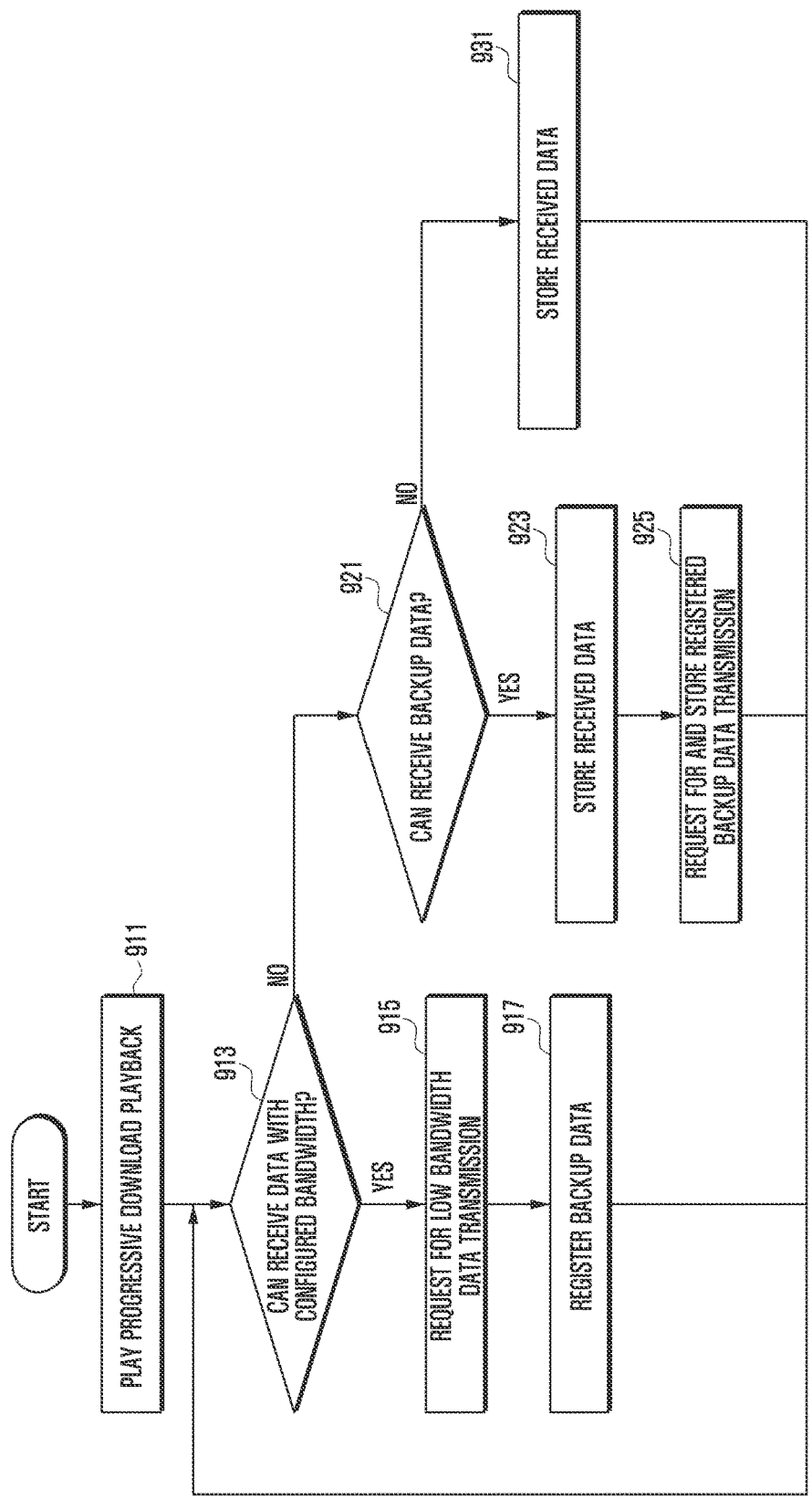
FIG. 9 is a flowchart illustrating a procedure of progressive download playback of a terminal device according to an exemplary embodiment of the present invention.

FIG. 9 is a flowchart illustrating a procedure of progressive download playback of a terminal device according to an exemplary embodiment of the present invention.

Referring to FIG. 9, the terminal device 200 requests the server 100 for the multimedia data to perform progressive download playback at step 911. If the terminal device 200 requests the server 100 to transmit multimedia data, the server 100 transmits the information or the requested multimedia data to the terminal device 200, the information including information on the available bandwidths of the multimedia data. Upon receipt of the information, the terminal device 200 measures the data transfer rate (i.e., data reception rate of the terminal device 200) and requests for the transmission of the multimedia data having the bandwidth corresponding to the measured data transfer rate.

At this time, the reception rate of the data transmitted by the server 100 is less than the data reception rate corresponding to the reference bandwidth set by the user, the control unit 600 detects this at step 913 and requests for transmission of the multimedia data having the bandwidth narrower than that corresponding to the reference bandwidth at step 915 while playing the received data. Next, the control unit 600 registers the information on the duration during which the multimedia data having the narrow bandwidth has been received at step 917. In this case, the narrow bandwidth data can be stored or not.

Otherwise, if the reception rate of the data transmitted by the server 100 is greater than the data reception rate corresponding to the reference bandwidth set by the user, the control unit 600 determines whether the data reception rate is high enough to receive the backup-registered data at step 921. If the data reception rate is high enough to receive the backup-registered data, the control unit requests for transmission of the multimedia data for current playback and plays and stores the multimedia data received through the playback channel at step 923. Here, the data reception rate is configured to trigger the request for the transmission of the backup data when the current data reception rate is high enough to receive the data having the bandwidth equal to or wider than the reference bandwidth and the data to be played (i.e., buffered data) is equal to or larger than the amount corresponding to a preset time duration (e.g., N unit data). Afterward, the control unit 600 requests for retransmission of the multimedia data registered as backoff data and stores the multimedia data downloaded through the backup channel at step 925.

If the data reception rate is not high enough to receive the backup-registered data instead of having the data reception rate corresponding to the preset reference bandwidth or, if the data rate is high enough but there is no data for backup, the control unit requests for transmission of the multimedia data to be played and plays and stores the multimedia data downloaded through the playback channel at step 931.

Figure 10:
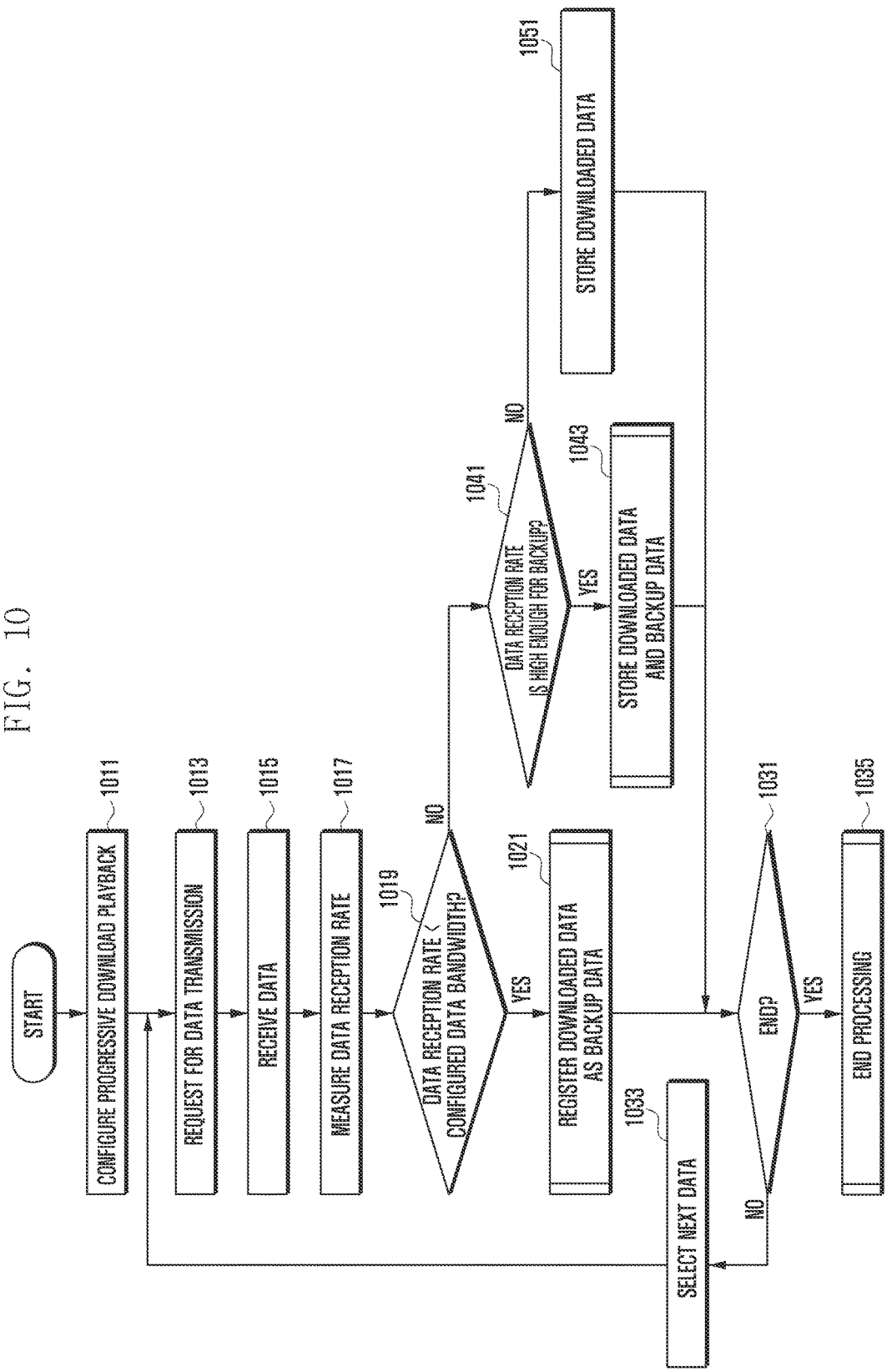
FIG. 10 is a flowchart illustrating a procedure for downloading and processing multimedia data in progressive download playback of a terminal device according to an exemplary embodiment of the present invention.
Figure 11:
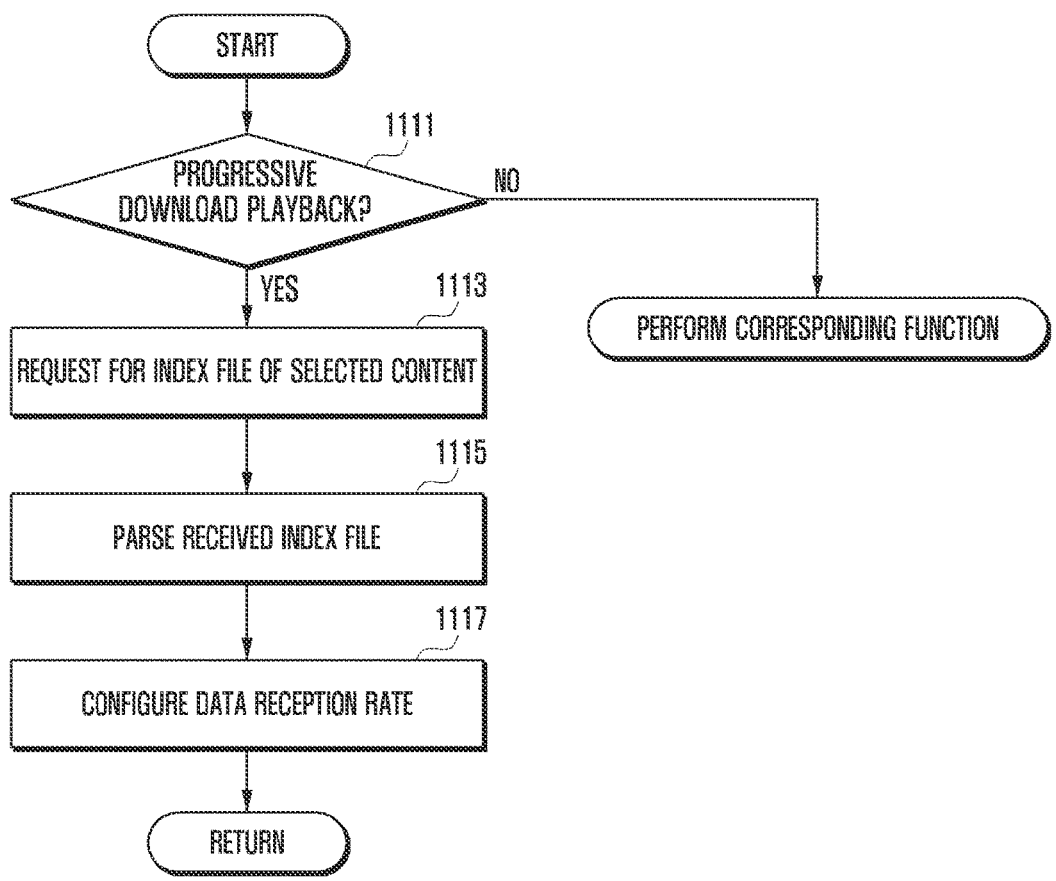
FIG. 11 is a flowchart illustrating a progressive download playback configuration according to an exemplary embodiment of the present invention.
Figure 12:
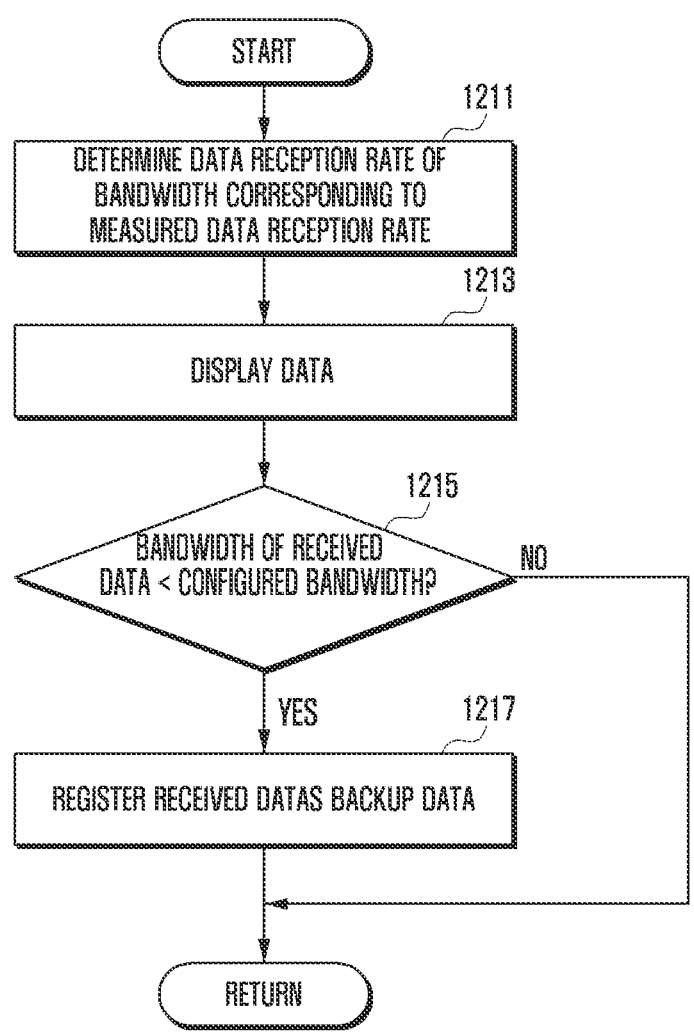
FIG. 12 is a flowchart illustrating narrow bandwidth multimedia data download and processing according to an exemplary embodiment of the present invention.
Figure 13:
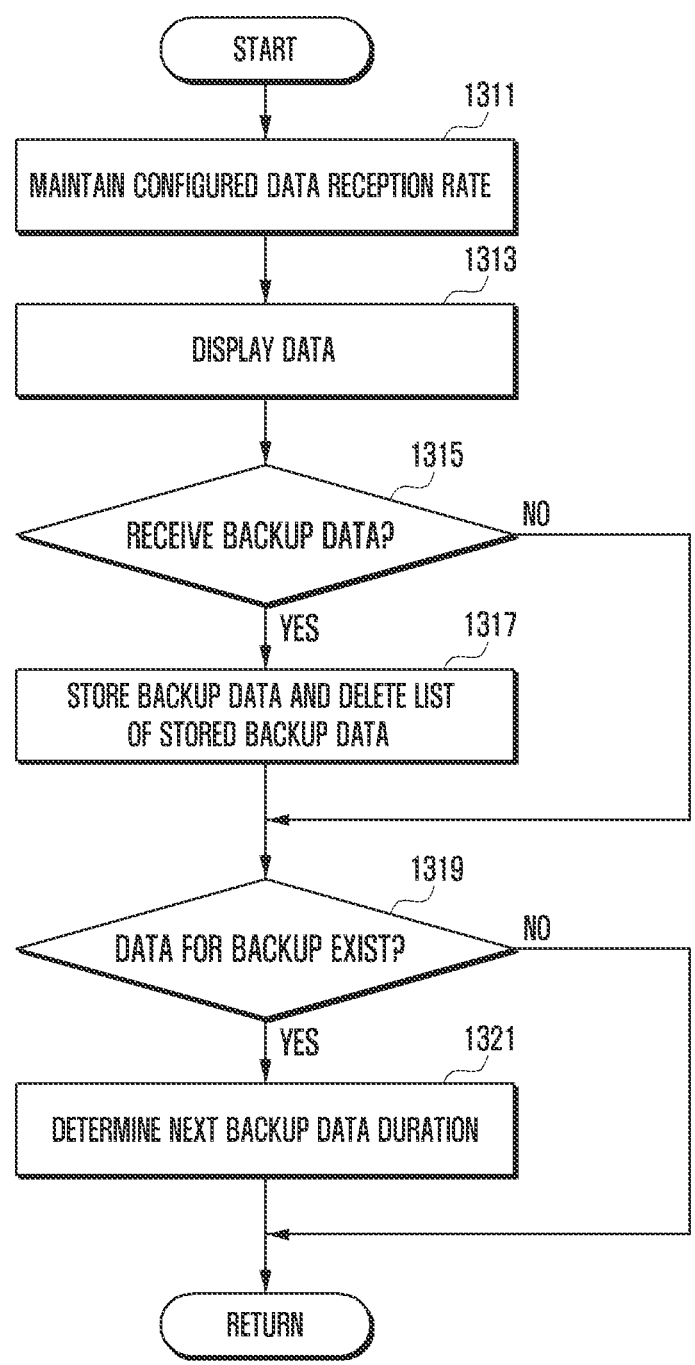
FIG. 13 is a flowchart illustrating reference bandwidth multimedia data and backup multimedia data download and processing according to an exemplary embodiment of the present invention.
Figure 14:
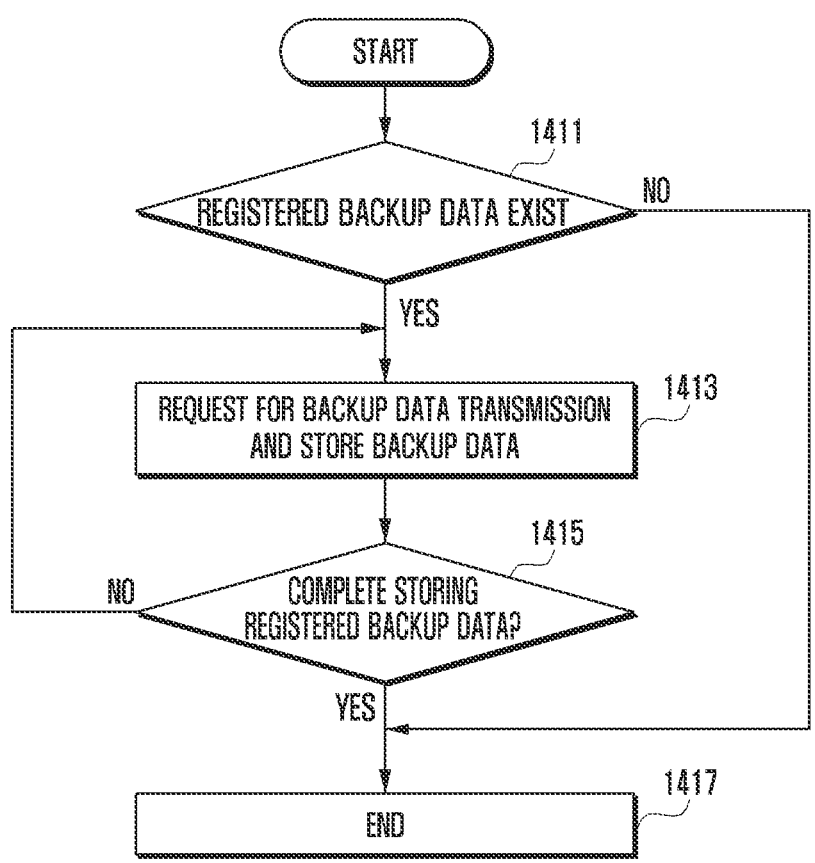
FIG. 14 is a flowchart illustrating a progressive download playback function termination according to an exemplary embodiment of the present invention.
Figure 15:
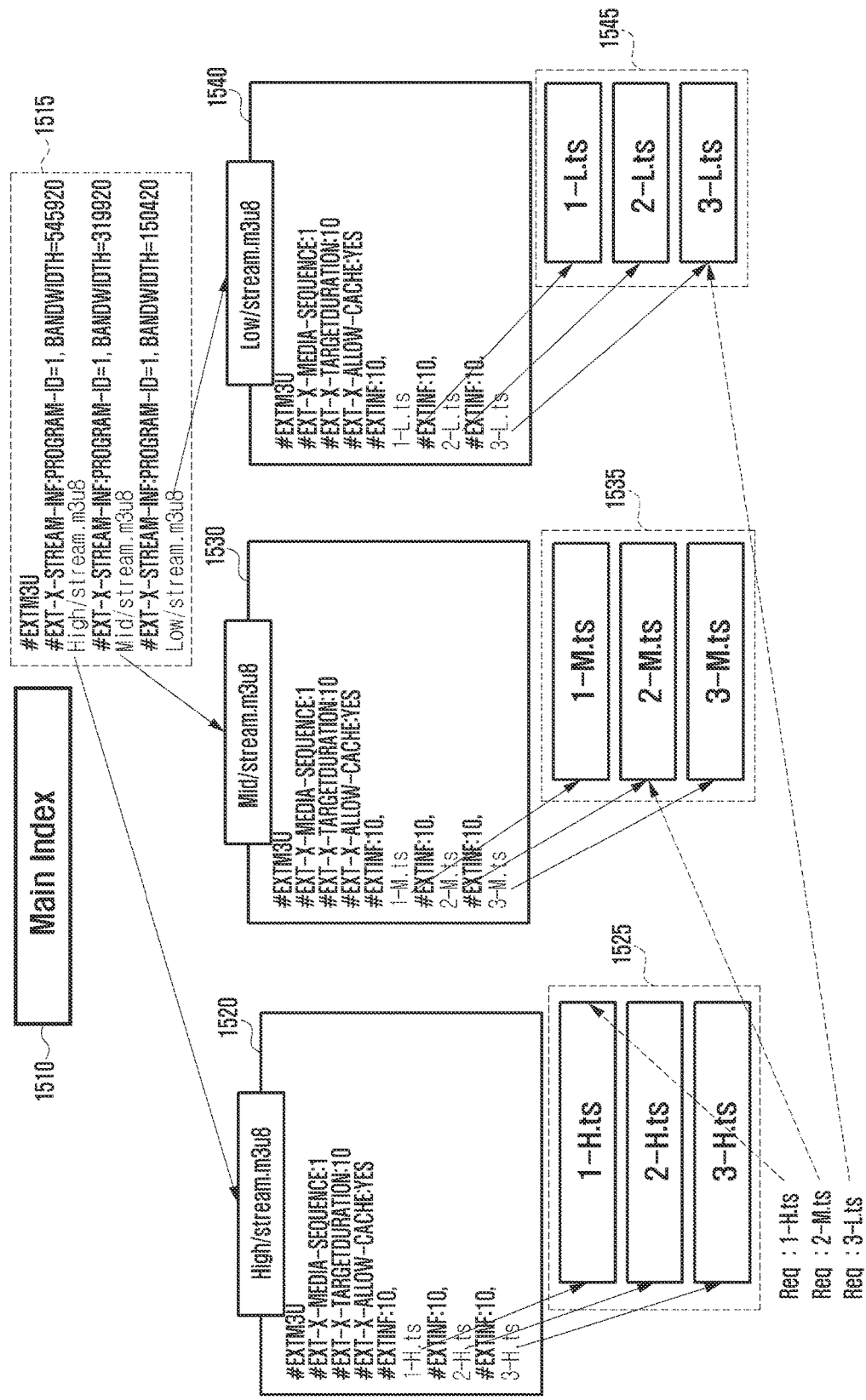
FIG. 15 is a diagram illustrating an index file structure of Hypertext Transfer Protocol (HTTP) live streaming according to an exemplary embodiment of the present invention.
Figure 16A:
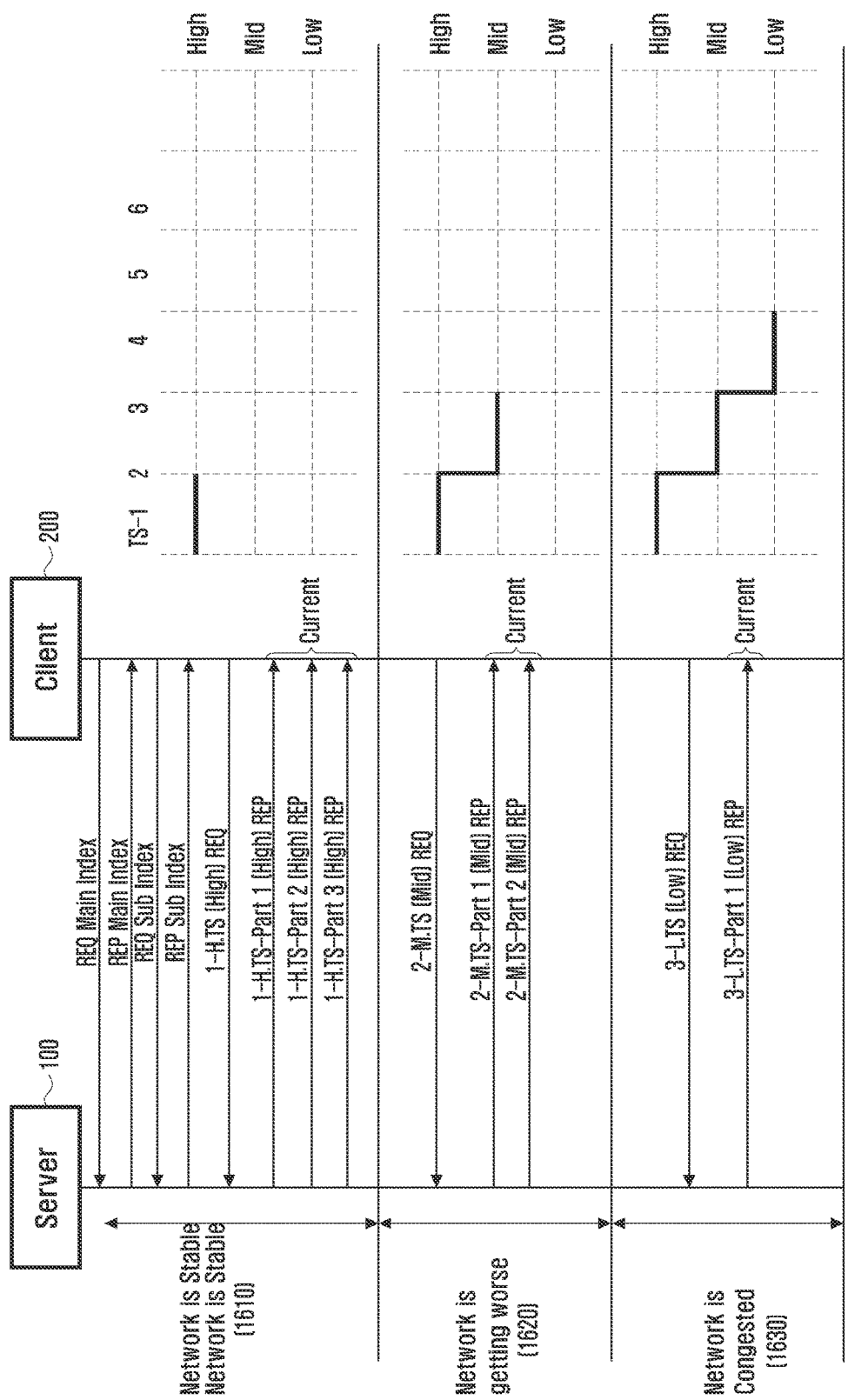
Figure 17:
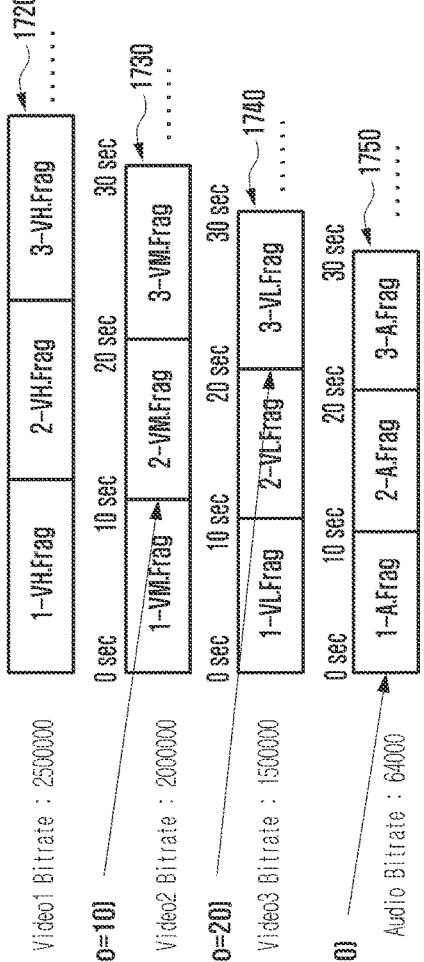
FIG. 17 is a diagram illustrating an index file structure of a smooth streaming according to an exemplary embodiment of the present invention.
Figure 18A:
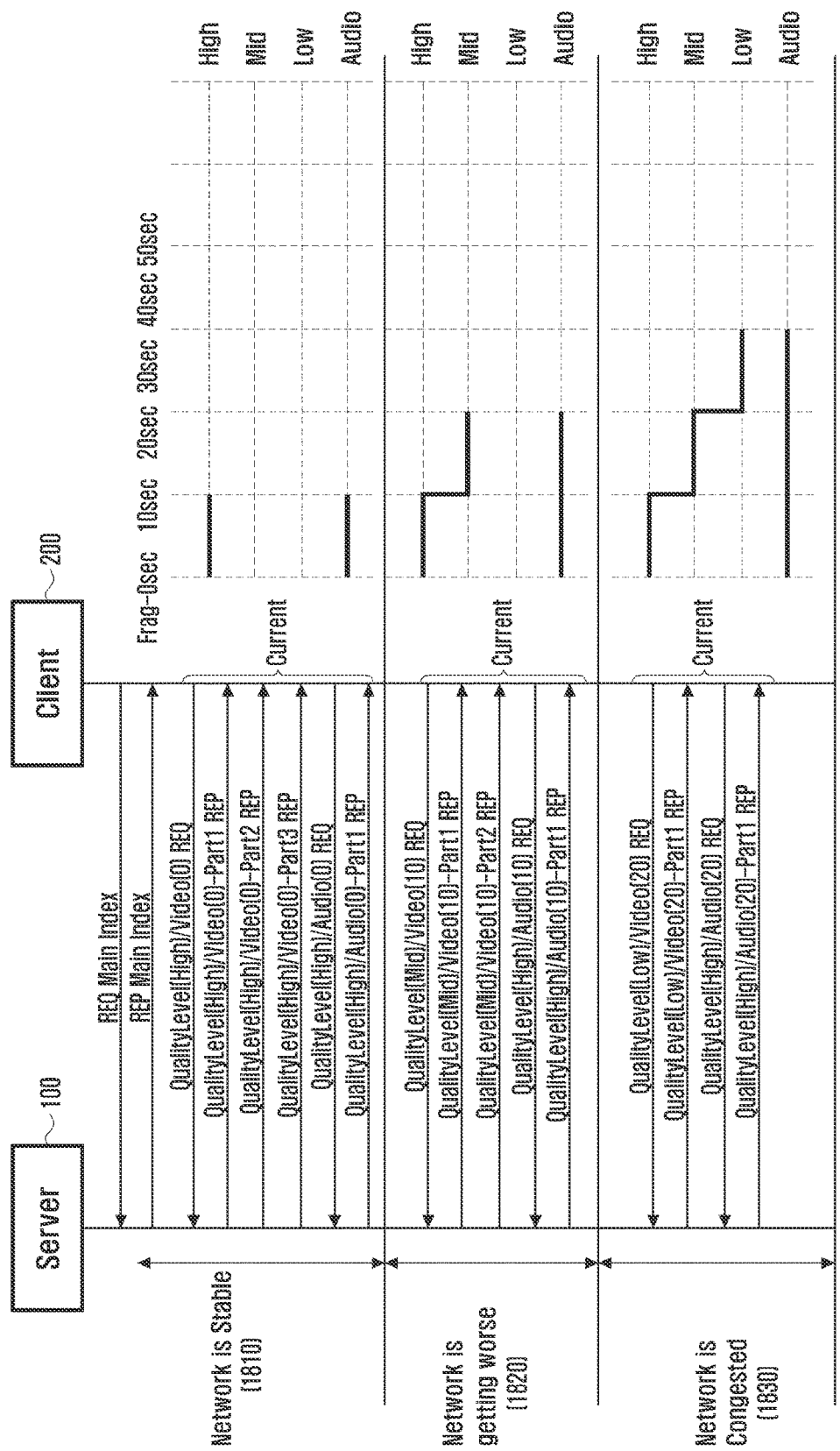

FIG. 10 is a flowchart illustrating a procedure for downloading and processing multimedia data in progressive download playback of a terminal device according to an exemplary embodiment of the present invention. FIG. 11 is a flowchart illustrating progressive download playback configuration according to an exemplary embodiment of the present invention, FIG. 12 is a flowchart illustrating narrow bandwidth multimedia data download and processing according to an exemplary embodiment of the present invention, FIG. 13 is a flowchart illustrating reference bandwidth multimedia data and backup multimedia data download and processing according to an exemplary embodiment of the present invention, and FIG. 14 is a flowchart illustrating progressive download playback function termination according to an exemplary embodiment of the present invention. FIG. 15 is a diagram illustrating an index file structure of HTTP live streaming according to an exemplary embodiment of the present invention, and FIGS. 16A and 16B are diagrams illustrating an operation mechanism of progressive download playback in an HTTP live stream using an index file structure according to an exemplary embodiment of the present invention. FIG. 17 is a diagram illustrating an index file structure of smooth streaming according to an exemplary embodiment of the present invention, and FIGS. 18A and 18B are diagrams illustrating an operation mechanism of progressive download playback in a smooth stream using an index file structure according to an exemplary embodiment of the present invention.

Referring to FIG. 10, if the multimedia data is selected and requested for being played in the progressive download playback mode through the input unit 650, the control unit 600 downloads the index file of the selected multimedia data from the server 100 and configures the progressive download playback function at step 1011. The progressive download playback function configuration is described in more detail with reference to FIG. 11.

Referring to FIG. 11, if the progressive download playback is requested, the control unit 600 detects the request at step 1111 and requests the server 100 to transmit the index file of the selected multimedia data at step 1113. The server 100 transmits the index file of the requested multimedia data, and the control unit 600 parses the received index file at step 1115 and analyzes the parsed index file to configure the bandwidth of the multimedia data to be received in the progressive download at step 1117.

In the case that the multimedia data is HTTP live streaming, the index file has a structure as illustrated in FIG. 15. Referring to FIG. 15, a main index 1510 includes an index file 1515 that further includes a relative address (High/stream.m3u8, Mid/stream.m3u8, and Low/stream.m3u8) of sub index files as denoted by reference numbers 1520, 1530, and 1540 and minimum bandwidth information. The minimum bandwidth is 54920 for the multimedia data as denoted by reference number 1520, 319920 for the multimedia data as denoted by reference number 1530, and 150420 for the multimedia data as denoted by reference number 1540. This means that the multimedia file of the sub-index file 1520 has the widest bandwidth.

The index files 1520, 1530, and 1540 have the information on the respective multimedia data 1525, 1535, and 1545 composed of unit data constituting the multimedia data, and the unit data corresponds to units of TS. The playback durations of the H.TS, M.TS, and L.TS are identical among each other and have different bandwidths. In this case, the data rate of the H.TS data has to be 3 times higher than that of the L.TS. Accordingly, when the multimedia data with wide bandwidth is selected, the data reception rate should be configured to fulfill the H.TS playback duration at step 1117.

In the case that the multimedia data is smooth streaming, the index file has the structure of FIG. 17. Referring to FIG. 17, the main index 1710 includes index file 1715 that includes the display time (duration=2283533534), multimedia type (streamindex type=video), codec information (subtype=WVCI), and unit data playback time (c n="0" d="19602937"..., where d indicates playback duration). At this time, the smooth streaming includes the information on the above structured video data and audio data matched with the video data. In the case of the smooth streaming, the unit data is fragment; the multimedia data classified into wide 1720, intermediate 1730, and narrow 1740 bandwidth multimedia data according to the transfer bandwidth; and the audio data 1750 has the same bandwidth regardless of the bandwidth of the video data. The video fragments are classified into VH.Frag, VM.Frag, and VL.Frag according to the bandwidth and have the same playback duration at the terminal device 200 regardless of their bandwidth. The data transfer rate of VH.Frag is higher than those of VM.Frag and VL.Frag. Accordingly, in the case that the multimedia data with wide bandwidth is selected, the data reception rate is configured to fulfill the playback duration of the VH.Frg at step 1117.

Referring again to FIG. 10, after configuring the progressive download playback function at step 1011, the control unit 600 requests the server 100 to transmit unit data at step 1013. At this time, the unit data is transmitted along with the transfer bandwidth information which is determined as a result of a comparison between the reception rate of the multimedia data at the terminal device 200 and the preset transfer data rate. According to an exemplary embodiment of the present invention, it is assumed that the transfer bandwidth is set to H.TS (or VH.Frag). The server 100 transmits the unit data of the bandwidth corresponding to the request through the playback channel, and the control unit 600 receives the unit data at step 1015 and measures the reception rate of the unit data at step 1017. When the server 100 transmits the unit data (TS or Frag), the unit data can be transmitted as split into two segments. That is, the server 100 is capable of segmenting the TS or Frag data into multiple segments and transmitting the segments.

FIGS. 16A and 16B are directed to an exemplary case where the H.TS is transmitted as segmented into three segment data of H.TS-part 1 (High), H.TS-part 2 (High), and H.TS-part 3 (High). And the M.TS is transmitted as segmented into two segment data of M.TS-part 1 (Mid) and M.TS-part 2 (Mid). The L.TS is transmitted without being segmented. FIGS. 18A and 18B are directed to an exemplary case where the VH.Frag is transmitted as segmented into three segments of QualityLevel(High)/Video(0)-Part1, QualityLevel(High)/Video(0)-Part2, and QualityLevel(High)/Video(0)-Part3. And the Vm/Frag is transmitted as segmented into two segments of QualityLevel(Mid)/Video(10)-Part1 and QualityLevel(Mid)/Video(10)-Part. In this case, the terminal device 200 receives the segments of the unit data to measure the data reception rate.

At this time, it is possible to determine the playback duration of the unit data as shown in FIGS. 15 and 17. The control unit 600 measures the reception rate of the data (i.e., reception time of the unit data) received through the playback channel and compares the measured data reception rate with the unit data playback duration having the reference bandwidth. If the unit data reception rate is less than that corresponding to the playback duration of the unit data, the terminal device 200 requests for the transmission of the unit data of the multimedia having the bandwidth narrower than the reference bandwidth and, otherwise, if the unit data reception rate is equal to or greater than that corresponding to the playback duration of the unit data, requests for the transmission of the unit data to be played currently and the data for backup.

As a result of comparison, if the unit data reception rate is less than that corresponding to the playback time of the unit data, the control unit 600 detects this at step 1019, displays the downloaded data and registers the currently received unit data as backup data with the download table at step 1021.

Referring to FIG. 12, the control unit 600 determines the bandwidth corresponding to the reception rate of the measured data at step 1211. That is, since the current communication environment is so bad as to not receive the unit data having the reference bandwidth, the control unit 600 determines to request for the transmission of the unit data having the bandwidth narrower than the preset reference bandwidth. Afterward, the control unit 600 displays the unit data, which is supposed to be displayed currently, on the display unit 640 at step 1213, determines whether the currently downloaded unit data has the bandwidth narrower than the reference bandwidth at step 1215, and registers, if so, the corresponding unit data as the backup data with the download table at step 1217.

Afterward, the control unit 600 determines whether the current unit data is the last multimedia data at step 1031 and, if not, selects the next data at step 1033 and determines the reference bandwidth corresponding to the reception rate of the unit data to be received next at step 1211, and requests the server 100 to transmit the next unit data at step 1013. That is, if the data reception rate is determined to correspond to the M.TS (or L.TS) or VM.Frag (or VL.Frag) after receiving the H.TS or VH.Frag unit data in the nth unit data duration, the control unit 600 sets the data reception rate of the (N+1)th unit data to M.TS (or L.TS) or VM.Rfag (or VL.Frag) bandwidth at step 1033. Accordingly, when the data reception rate is less than that corresponding to the reference bandwidth, the control unit 600 completes receiving the currently downloaded unit data and then changes the bandwidth of the next unit data.

As a result of comparison, if the unit data reception rate is higher than that corresponding to the playback time of the unit data, the control unit 600 detects this at step 1019 and determines whether the data reception rate is high enough for downloading the backup data at step 1041. According to an exemplary embodiment of the present invention, if the unit data reception rate is higher than that corresponding to the playback time of the unit data and if a number of the currently downloaded unit data is equal to or greater than a predetermined value, the control unit 600 determines that the data reception rate is high enough for data backup. Assuming that the predetermined number of unit data is 3, the control unit 600, if the current data reception rate is higher than that of the preset unit data and if the number of the unit data not downloaded and played currently is equal to or greater than 3, the control unit 600 determines that the data reception rate is high enough for data backup. In this case, if the backup data has been registered with the download table, the control unit 600 requests for the backup data transmission and stores the downloaded backup data at step 1043.

Referring to FIG. 13, the control unit 600 configures to request for the next unit data with the reference bandwidth (i.e., H.TS or VH.Frag) at step 1311 and displays the unit data to be played currently on the display unit 640 at step 1313. Afterward, if the backup multimedia data is received, the control unit 600 detects this at step 1315 and stores the received backup unit data in the unit data storage region of the storage unit 610 and deletes the registration of the corresponding unit data from the download table at step 1317. Afterward, the control unit 600 checks the download table to determine whether there is the backup data to be downloaded further at step 1319 and, if so, determines the duration for unit data backup at step 1321. In the case of the unit data with high bandwidth, it is possible to receive the unit data as segmented into multiple segment data as depicted in FIGS. 16A, 16B, 18A, and 18B. Accordingly, the control unit 600 determines the reception rate of the receivable backup data and then determines segmentation of the backup data according to the backup data reception rate.

If it is determined that the procedure termination is not requested at step 1031, the control unit 600 configures the unit data to be received (including reference bandwidth and number of the unit data to be received) through the playback channel and the unit data to be downloaded as backup data (including reference bandwidth, backup unit data number, and segment number) and then requests for the transmission of the current unit data and backup unit data at step 1013.

According to an exemplary embodiment of the present invention, if it is determined that the data reception rate is high enough for data backup, the control unit 600 configures the data reception rate corresponding to the reference bandwidth as that of the unit data to be requested for next download and configures the backup data amount as much as the bandwidth further receivable during the unit data playback duration. For example, if the playback duration of the unit data is 10 seconds and if it takes 7 seconds to receive the unit data at the currently measured data reception rate, the control unit 600 is capable of configuring the backup data duration of 3 seconds to request for the transmission of the backup data along with the next unit data. At this time, the unit data having the configured bandwidth is received as segmented into multiple segment data and, if the size of the unit data and the number of segments are given, it is possible to know the size of the segment data.

Accordingly, it is possible to determine the reception time (i.e., download time) of the unit data based on the currently measured data reception rate and calculate the time for receiving the backup data by subtracting the actual reception time of the unit data from the playback duration of the unit data such that the control unit 600 configures the size of the backup data to be received for the residual time and then selects the unit data to be downloaded as registered with the download table. Next, the control unit 600 requests for the transmission rate of the unit data and selected backup unit data (at this time, the backup unit data can be a segment data of the corresponding unit data). The size of the segment data is indicated by data size information in the header of the received segment data (e.g., HTTP header) and thus, if the backup data is downloaded in units of segment, the unit data can be generated using the segment header information.

In addition to the method of receiving the backup data during the time duration remaining after excluding the unit data, it is possible to request for transmission of backup data only in the corresponding unit data duration. That is, if the communication environment is good enough (i.e., if the time required for the terminal device 200 to receive the unit data is shorter than the playback time of the unit data), the control unit 600 is capable of requesting for the unit data transmission in sequence. In this case, the unit data having the sequence numbers greater than the unit data which is currently played on the display unit 640 (i.e., the unit data to be played long later) are stored in the storage unit 610. In this case, it is possible to request for the backup unit data registered with the download table and store the downloaded backup unit data upon completing or terminating the download of the unit data. In this case, the control unit 600 accesses the unit data corresponding to the configured playback duration to display on the display unit 640 and stores the backup unit data received simultaneously in the storage unit 610.

If the measured data reception rate satisfies the reference bandwidth but is lower than that corresponding to the bandwidth for receiving the back data or if the data reception rate is high enough for backup but there is no data for backup, the control unit 600 detects this at step 1041, accesses the unit data to be played currently on the display unit 640 at step 1051, and stores the received unit data in the unit data region of the storage unit 610. If the progressive download playback is not terminated, the control unit 600 detects this at step 1031 and determines the data reception rate of the unit data to be transmitted next as the reference bandwidth at step 1033.

The progressive download playback is performed as described above and, if the playback completes, the control unit 600 terminates the progressive download playback at step 1035.

Referring to FIG. 14, the control unit 600 checks the download table at step 1411 to determine whether there is information on the backup data to be downloaded. If there is the data for backup, the control unit 600 transmits the information on the unit data for backup (unit data number and bandwidth of the unit data to be downloaded) to the server 100 and stores the downloaded backup data in the storage unit 610 at step 1413. Afterward, the control unit 600 determines whether the download of the registered backup data has completed at step 1415 and, if not completed, the procedure returns to step 1413 to request for the backup data transmission for the next unit data reception duration and play the received backup data. If it is determined that the backup data has downloaded and stored completely at step 1415, the control unit 600 ends the progressive download playback procedure at step 1417.

As described above, if the data reception rate of the terminal device 200 is lower than that corresponding to the playback time of the unit data having the reference bandwidth, the terminal device 200 requests for transmission of the unit data having the bandwidth narrower than the reference bandwidth and, if the unit data having the bandwidth narrower than the reference bandwidth is received, registers the corresponding unit data duration as backup duration. If the unit data having the bandwidth narrower than the reference bandwidth is received, the terminal device 200 plays the downloaded narrow bandwidth (i.e., low video quality) data and registers the corresponding unit data as backup data. If the data reception rate of the terminal device 200 becomes higher than that corresponding to the reference bandwidth and thus it becomes possible to receive the backup data, the terminal device 200 downloads the unit data having reference bandwidth and stores the downloaded unit data in the storage unit 610. That is, if the communication environment is recovered, the terminal device 200 requests for the unit data registered with the download table and stores the backup data received in response to the request in the storage unit 610. In the progressive download playback, the terminal device 200 adjusts the bandwidth of the multimedia data according to the communication environment to download and play the multimedia data and re-downloads, when the communication environment is recovered, the multimedia data received with the bandwidth narrower than the reference bandwidth through the backup channel. In this way, the terminal device 200 is capable of playing the multimedia data seamlessly regardless of the communication environment in the progressive download playback and, it is possible to re-request the multimedia data downloaded with a bandwidth narrower than the reference bandwidth and store the multimedia data received with the reference bandwidth.

A description is made of the progressive download playback procedure of the HTTP Live Streaming with reference to FIGS. 15, 16A, and 16B. Once the multimedia data and bandwidth for storing the data are configured in the progressive download playback configuration procedure, the terminal device 200 requests the server 100 for the main index file and sub-index file (see FIG. 15), and the server 100 transmits the main index file and the sub-index file in response to the request as denoted by reference number 1610. The drawing is directed to an exemplary case where High/stream is selected as the sub-index file. The terminal device 200 parses the index files to check the structure of the unit data having the reference bandwidth.

First, if the index files are received as denoted by reference number 1610, the terminal device 200 analyzes the reception rate of the data and requests for the first unit data. The data reception rate is high enough to receive the data having the reference bandwidth (i.e., if the network is stable), the terminal device 200 requests the server 100 for the 1-H.TS unit data, and the server 100 transmits the 1-H.TS data to the terminal device 200. FIGS. 16A and 16B are directed to an exemplary case where the H.TS is composed of three segment data and the M.TS is composed of two segment data.

The terminal device 200 receives and stores the 1-H.TS unit data. While downloading the 1-H.TS unit data, the terminal device 200 measures the reception rate of the unit data. At this time, if the data reception rate is lower than that corresponding to the unit data playback time of the reference bandwidth, the unit data having a narrow bandwidth is selected (here, the second TS can be selected).

Second, if the data reception rate is lower than that corresponding to the playback time of the unit data having the reference bandwidth (i.e., the network condition getting worse), the terminal device 200 requests the server 100 for 2-M.TS as denoted by reference number 1620. Upon receipt of the request, the server 100 transmits the 2-M.TS unit data to the terminal device 200. At this time, the terminal device 200 registers the downloaded 2-M.TS unit data with the download table as backup unit data. The terminal device 200 measures the data reception rate while downloading the 2-M.TS unit data and, if the data reception rate gets worse, configures the unit data to be requested next (here, the third TS) with the narrowest bandwidth.

Third, if the data reception rate is very low (i.e., if the network is congested), the terminal device 200 requests the server 100 for the 3-L.TS as denoted by reference number 1630. Upon receipt of the request, the server 100 transmits the 3-L.TS unit data to the terminal device 200. At this time, the terminal device 200 registers the downloaded 3-L.TS unit data with the download table as back unit data. The terminal device 200 measures the data reception rate while downloading the 3-L.TS unit data. If the data reception rate is recovered to the normal state so as to be possible for receiving the unit data having the reference bandwidth, the terminal device 200 configures the unit data to be requested next (here, the fourth TS) with reference bandwidth.

Fourth, if the data reception rate is high enough to receive the data having the reference bandwidth (i.e., if the network is recovered), the terminal device 200 requests the server 100 for the 4-H.TS unit data, and the server 100 transmits the 4-H.TS data to the terminal device 200. The terminal device 200 receives and stores the 4-H.TS unit data. The terminal device 200 measures the reception rate of the unit data while downloading the 4-H.TS unit data. At this time, if the data reception rate is higher than that corresponding to the unit data playback time and enough to receive the backup-registered unit data, the terminal device 200 configures the unit data to be requested next (here, the fifth TS) with the reference bandwidth.

Fifth, if the data reception rate is high enough to receive the data of the reference bandwidth (i.e., if the network is stable), the terminal device 200 requests the server 100 for the 5-H.TS unit data and 2-H.TS as backup unit data such that the server 100 transmits the 5-H.TS data to the terminal device 200, the 5-H.TS data is downloaded and stored by the terminal device 200. The server 100 also transmits the 2-H.TS data to the terminal device 200 which receives and stores the 2-H.TS data. At this time, all or some of the segments (three segments in this exemplary embodiment) constituting backup unit data 2-H.TS can be downloaded. Such a download determination can be made by the terminal device 200 or the server 100 in accordance with the measurement data reception rate. In this case, the terminal device 200 can store the segment data as combined or as segmented. The terminal device 200 measures the unit data reception rate while downloading the 5-H.TS unit data. At this time, if the data reception rate is higher than that corresponding to the unit data playback time of the reference bandwidth and enough to receive the backup-registered unit data, the terminal device 200 configures the unit data to be requested next (here, the sixth TS) with the reference bandwidth.

Sixth, if the data reception rate is high enough to receive the data of the reference bandwidth (i.e., if the network is stable), the terminal device 200 requests the server 100 for the 6-H.TS unit data and the remaining data of 2-H.TS as backup unit data, and the server 100 transmits the 6.-H.TS data to the terminal device 200 which receives and stores the 6-H.TS unit data as denoted by reference number 1660. The server 100 also transmits the 2-H.TS data to the terminal devices 200 which receives and stores the 2-H.TS unit data.

As described with reference to FIGS. 16A and 16B, when the network environment is bad (i.e., if the data reception rate of the terminal device 200 is lower than that corresponding to the playback time of the unit data), the terminal device 200 downloads the unit data having the bandwidth narrower than the reference bandwidth as denoted by reference numbers 1620 and 1630 and, if the network is recovered to be stable as denoted by reference number 1640 and thus the data reception rate of the terminal device 200 increases, downloads and stores the unit data registered as backup data along with the unit data supposed to be downloaded currently as denoted by reference numbers 1650 and 1660. At this time, the downloaded unit data is accumulated to reach a predetermined playback time amount and, if a predetermined playback-available amount is secured (i.e., a predetermined number of unit data are accumulated), the terminal device 200 accesses the stored unit data to play the multimedia data.

A description is made of the progressive download playback procedure of the Smooth Streaming with reference to FIGS. 17, 18A, and 18B. Once the multimedia data and bandwidth for storing the data are configured in the progressive download playback configuration procedure, the terminal device 200 requests the server 100 for the index file structured as shown in FIG. 17, and the server 100 transmits the index file in response to the request as denoted by reference number 1810. The terminal device 200 parses the index file to determine the configuration of the unit data of the reference bandwidth. In the case of the smooth streaming, the video and audio data are configured separately such that the terminal device 200 has to request for the video data of the reference bandwidth and audio data for downloading. In the case of the smooth streaming, the fragments of the video data include the playback time information. In this case, the terminal device 200 requests for the unit data including the time information. Here, it is assumed that the fragment unit data playback time is 10 seconds.

After receiving the index file, the terminal device 200 first analyzes the reception rate of the data to request for the first unit data transmission as denoted by reference number 1810. The data reception rate is high enough to receive the data of the reference bandwidth (i.e., if the network is stable), the terminal device 200 requests the server 100 for the QualityLevel(High)/Video(0) unit data, and the server 100 transmits the QualityLevel(High)/Video(0) to the terminal device 200 in response to the request. FIGS. 18A and 18B are directed to an exemplary case where the QualityLevel (High)/Video is segmented into three segment data and QualityLevel(Mid)/Video is segmented into two segment data. The terminal device 200 requests for the QualityLevel (High)/Audio(0) audio data of the corresponding fragment, and the server 100 transmits the audio data to the terminal device 200 which stores the downloaded audio data.

The terminal device 200 receives and stores the QualityLevel(High)/Video(0) unit data as described above. The terminal device 200 measures the reception rate of the unit data while downloading the QualityLevel(High)/Video(0) unit data. At this time, if the data reception rate is lower than that corresponding to the playback time of the unit data having the reference bandwidth, the terminal device 200 selects the unit data to be requested next (here, the second fragment) with a low bandwidth.

Second, if the data reception rate is less than that corresponding to the playback time of the unit data having the reference bandwidth (i.e., if the network is getting worse), the terminal device 200 requests the server 100 for QualityLevel(Mid)/Video(10) transmission as denoted by reference number 1820. In response to the request, the server 100 transmits the QualityLevel(Mid)/Video(10) unit data to the terminal device 200. At this time, the terminal device 200 registers the video unit data of the second fragment downloaded from the server 100 with the download table as backup unit data. The terminal device 200 also requests for the QualityLevel(High)/Audio(10) audio data, and the server 100 transmits the audio data to the terminal device 200 which stores the downloaded audio data. At this time, the audio data is downloaded in the same size regardless of the data reception rate. The terminal device 200 measures the data reception rate while downloading the video unit data of the second fragment and, if the data reception rate is getting bad, the terminal device 200 configures the unit data to be requested next with a low bandwidth.

Third, if the data reception rate is very low (i.e., the network is congested), the terminal device 200 requests the server 100 for QualityLevel(Low)/Video(20) as denoted by reference number 1830. In response to the request, the server 100 transmits the QualityLevel(Low)/Video(20) unit data to the terminal device 200. At this time, the terminal device 200 registers the downloaded QualityLevel(Low)/Video(20) unit data with the download table as backup unit data. The terminal device 200 measures the data reception rate while downloading the unit data. At this time, if the data reception rate is recovered high enough to receive the unit data of reference bandwidth, the terminal device 200 configures the unit data to be requested next (here, the fourth fragment) with the reference bandwidth.

Fourth, if the data reception rate is high enough to receive the data of the reference bandwidth (i.e., if the network is recovered), the terminal device 200 requests the server 100 for the QualityLevel(High)/Video(30) unit data, and the server 100 transmits the QualityLevel(High)/Video(30) data to the terminal device 200 which receives and stores the downloaded QualityLevel(High)/Video(30) data as denoted by reference number 1840. The terminal device 200 requests for the audio data of the corresponding fragment and stores the audio data downloaded in response to the request. The terminal device 200 measures the data reception rate while downloading the data. If the data reception rate is higher than that corresponding to the playback time of the unit data having the reference bandwidth and thus it is possible to receive the backup-registered unit data, the terminal device 200 configures the unit data to be requested next with the reference bandwidth.

Fifth, if the data reception rate is high enough to receive the data of the reference bandwidth (i.e., if the network is stable), the terminal device 200 requests the server 100 for the QualityLevel(High)/Video(40) unit data, and the server 100 transmits the QualityLevel(High)/Video(40) data to the terminal device 200 which receives and stores the QualityLevel(High)/Video(40) as denoted by reference number 1850. The terminal device 200 also requests the server 100 for the backup-registered QualityLevel(High)/Video(10) data. In response to this request, the server 100 transmits the QualityLevel(High)/Video(10) data to the terminal device 200, which receives and stores the QualityLevel(High)/Video(10) data. At this time, all or some of the segments (three segments in this exemplary embodiment) constituting backup unit data QualityLevel(High)/Video(10) can be downloaded. Such a download determination can be made by the terminal device 200 or the server 100 in accordance with the measurement data reception rate. In this case, the terminal device 200 can store the segment data as combined or as segmented. The terminal device 200 measures the unit data reception rate while downloading the data. At this time, if the data reception rate is higher than that corresponding to the unit data playback time of the reference bandwidth and enough to receive the backup-registered unit data, the terminal device 200 configures the unit data to be requested next (here, the sixth fragment) with the reference bandwidth.

Sixth, if the data reception rate is high enough to receive the data of the reference bandwidth (i.e., if the network is stable), the terminal device 200 requests the server 100 for the QualityLevel(High)/Video(50) unit data as denoted by reference number 1860. In response to the request, the server 100 transmits the QualityLevel(High)/Video(50) data to the terminal device 200, which receives and stores the QualityLevel(High)/Video(50) unit data. The terminal device 200 also requests for the remaining data of backup-registered QualityLevel(High)/Video(10) unit data, and the server 100 transmits the QualityLevel(High)/Video(10) data to the terminal device 200, which receives and stores the QualityLevel(High)/Video(10).

As described with reference to FIGS. 18A and 18B, when the network environment is bad (i.e., if the data reception rate of the terminal device 200 is lower than that corresponding to the playback time of the unit data), the terminal device 200 downloads the unit data having the bandwidth narrower than the reference bandwidth as denoted by reference numbers 1820 and 1830 and, if the network is recovered to be stable and thus the data reception rate of the terminal device 200 increases, downloads and stores the unit data registered as backup data along with the unit data supposed to be downloaded currently as denoted by reference numbers 1850 and 1860. At this time, the downloaded unit data is accumulated to reach a predetermined playback time amount and, if a predetermined playback-available amount is secured (i.e., a predetermined number of unit data are accumulated), the terminal device accesses the stored unit data to play the multimedia data.

While the invention has been shown and described with reference to certain exemplary embodiments thereof, it will be understood by those skilled in the art that various changes and forms in details may be made without departing from the spirit and scope of the invention as defined by the appended claims and their equivalents.

What is claimed is:

1. A data download method of a terminal device for processing data downloaded in a progressive download mode, the method comprising:
   measuring, by the terminal device, a first download rate of first data while the first data being received, the first data having a first level of quality;
   when the measured first download rate is lower than a reference download rate, requesting, by the terminal device, for transmission of second data through a playback channel, the second data having a second level of quality that is lower than the first level of quality, stopping reception of the first data, and receiving the second data;
   registering, by the terminal device, a duration in which the second data is received as a backup duration;
   measuring, by the terminal device, a second download rate of the second data while the second data being received;
   determining, by the terminal device, an amount of data of the second data received but not played;
   when the second download rate is equal to or greater than the reference download rate and the determined amount of data of the second data is larger than a predetermined size, requesting, by the terminal device, for transmission of backup data corresponding to the second data through a backup channel, the backup data having the first level of quality and the backup duration; and
   storing, by the terminal device, the backup data.

2. The method of claim 1, further comprising:
   requesting, when the second download rate is greater than the reference download rate, for transmission of third data at the reference download rate; and
   storing the third data.

3. The method of claim 2, wherein each of the first data, the second data, and the third data comprises motion picture data.

4. A multimedia data playback method of a terminal device, the method comprising:
   configuring a reference download rate for progressive download playback;
   measuring a first download rate of first multimedia data while the first multimedia data being received;
   when the measured first download rate is lower than the reference download rate, requesting for transmission of backup multimedia data through a playback channel, stopping reception of the first multimedia data, and receiving the backup multimedia data;
   registering a duration during which the first download rate is lower than the reference download rate as a backup duration;
   measuring a download rate of the backup multimedia data while the backup multimedia data being received;
   determining a number of unit data of the backup multimedia data received but not played;
   when the download rate of the backup multimedia data is greater than the reference download rate and the determined number of the unit data of the backup multimedia data that are neither downloaded nor played is equal to or greater than a predetermined value, requesting for second multimedia data corresponding to the backup multimedia data through a backup channel, the second multimedia data having the backup duration;
   storing the received first multimedia data and the received backup multimedia data;
   storing, when the download rate of the second multimedia data matches the reference download rate, the second multimedia data; and
   requesting transmission of third multimedia data at the reference download rate,
   wherein the first multimedia data, the second multimedia data, and the third multimedia data correspond to a multimedia data file having a first level of quality.

5. The method of claim 4, wherein the backup multimedia data and the second multimedia data are respective copies of multimedia data having different levels of quality, and each copy includes respective unit data having a same playback time.

6. The method of claim 5, wherein the configuring comprises:
   selecting an index file of a selected multimedia data; and
   selecting a reference download rate of the unit data to be played in the progressive download playback by parsing the index file.

7. The method of claim 6, wherein the registering comprises:
   configuring the reference download rate corresponding to a download rate of downloaded unit data; and
   registering, when the download rate of the downloaded unit data is lower than the reference download rate, the duration of the download rate being lower than the reference download rate as the backup duration with a download table.

8. The method of claim 7, wherein the storing of the received first multimedia and the received backup multimedia data comprises:
   configuring the reference download rate as a data reception rate;
   storing, when the downloaded unit data is the backup multimedia data, the backup multimedia data;
   deleting the backup multimedia data from the download table; and
   configuring, when the backup multimedia data to be stored exists, the unit data for backup next in the download table.

9. The method of claim 8, further comprising downloading and storing the backup multimedia data which is not stored,
   wherein the downloading and storing of the backup multimedia data which is not stored comprises:
   configuring the unit data for backup next in the download table;
   requesting the transmission of the backup multimedia data;
   storing the backup multimedia data; and
   deleting the backup multimedia data from the download table.

10. The method of claim 7, wherein each of the first multimedia data, the second multimedia data, the third multimedia data, and the backup multimedia data comprises hypertext transfer protocol (HTTP) live streaming motion picture data, and the unit data comprises transport stream (TS).

11. The method of claim 10, wherein the unit data comprises motion picture data having one of a high TS (H.TS), a medium TS (M.TS), and a low TS (L.TS) data rate.

12. The method of claim 7, wherein each of the first multimedia data, the second multimedia data, the third multimedia data, and the backup multimedia data comprises smooth streaming motion picture data, and the unit data comprises a fragment (Frag).

13. The method of claim 12, wherein each of the first multimedia data, the second multimedia data, the third multimedia data, and the backup multimedia data comprises smooth streaming motion picture data having one of a video high Frag (VH.Frag), a video medium Frag (VM.Frag), or a video low Frag (VL.Frag) data rate.

14. A multimedia data processing method of a terminal device, the method comprising:
   measuring, by the terminal device, a download rate of multimedia data which is being downloaded and played while the multimedia data being received;
   when the measured download rate is lower than a reference download rate, requesting, by the terminal device, for transmission of second data through a playback channel, the second data having a second level of quality that is lower than the first level of quality, stopping reception of the multimedia data, and receiving the second data;
   registering, by the terminal device, when the measured download rate is less than a reference download rate, a duration during which the measured download rate is less than the reference rate as a backup duration, the multimedia data being stored simultaneously;
   re-measuring, by the terminal device, the download rate of the multimedia data while the multimedia data being received;
   storing, by the terminal device, when the re-measured download rate matches the reference download rate, the received multimedia data in a memory;
   determining, by the terminal device, an amount of data of the second data received but not played;
   requesting, by the terminal device, when the re-measured download rate is equal to or greater than the reference download rate and the determined amount of data of the second data is larger than a predetermined size, requesting, by the terminal device, for transmission of backup data corresponding to the multimedia data through a backup channel as corresponding backup duration data; and
   storing, by the terminal device, the backup data in the memory.

15. The method of claim 14, further comprising:
   requesting, when a multimedia data playback completes but the download of the multimedia data for the backup duration does not complete, for retransmission of the multimedia data for the backup duration; and
   downloading and storing the retransmitted multimedia data.

16. A progressive download playback apparatus of a terminal, the apparatus comprising:
   a transceiver configured to:
      request a server to transmit at least one of first data, second data, and backup data, and
      download the at least one of the first data or the second data, and the backup data through a playback channel and a backup channel, respectively;
   a memory including a download table and a content storage;
   a processor configured to:
      measure a first download rate of the first data having a first level of quality while the first data being received,
      when the measured first download rate is lower than a reference download rate, request transmission of the second data having a second level of quality lower than the first level of quality,
      register a duration in which the second data is downloaded as a backup duration with the download table,
      measure a second download rate while receiving the second data while the second data being received,
      determine an number of unit data of the second data received but not played,
      when the second download rate is equal to or greater than the reference download rate and the number of the unit data downloaded but not played is greater than a predetermined value, request the server to transmit the backup data corresponding to the second data through the backup channel, the backup data having the first level of quality and the backup duration, and
      store the backup data in the content storage; and
   a display configured to display the first data and the backup data under control of the processor.

17. The apparatus of claim 16, wherein the backup data and the second data are respective copies of a multimedia data file that have different levels of quality, and each copy comprises respective unit data having a same playback time.

18. The apparatus of claim 17, wherein, when a reception rate of measured data is less than the reference download rate, the processor is further configured to request data transmission at a download rate corresponding to the reception rate of the measured data.

19. The apparatus of claim 18, wherein the processor is further configured to:
   request, when the reception rate of the measured data is greater than the reference download rate, for data transmission, and store downloaded data in the content storage.

20. The apparatus of claim 19, wherein each of the first data, the second data, and the backup data comprises hypertext transfer protocol (HTTP) live streaming motion picture data, and the unit data comprises transport stream (TS).

21. The apparatus of claim 19, wherein each of the first data, the second data, and the backup data comprises smooth streaming motion picture data, and the unit data comprises fragment.

* * * * *